US006560582B1

United States Patent
Woodall

(10) Patent No.: US 6,560,582 B1
(45) Date of Patent: May 6, 2003

(54) DYNAMIC MEMORY PROCESSOR

(75) Inventor: Roger L. Woodall, Jewett City, CT (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/477,653

(22) Filed: Jan. 5, 2000

(51) Int. Cl.[7] .............................................. G06F 15/18

(52) U.S. Cl. .............................. 706/15; 706/18; 706/20; 706/27

(58) Field of Search ........................... 706/33, 16, 52, 706/26, 15, 18, 20, 27; 700/250, 286; 713/600; 707/6

(56) References Cited

U.S. PATENT DOCUMENTS

| 5,440,662 A | * | 8/1995 | Sukkar ........................ 704/236 |
| 5,613,037 A | * | 3/1997 | Sukkar ........................ 704/256 |
| 5,629,870 A | * | 5/1997 | Farag et al. ................. 700/286 |
| 5,666,467 A | * | 9/1997 | Colak .......................... 706/33 |
| 5,719,480 A | * | 2/1998 | Bock et al. ............. 318/568.11 |
| 5,745,382 A | * | 4/1998 | Vilim et al. .................. 706/16 |
| 5,845,271 A | * | 12/1998 | Thaler .......................... 706/16 |
| 5,852,815 A | * | 12/1998 | Thaler .......................... 706/16 |
| 5,852,816 A | * | 12/1998 | Thaler .......................... 706/20 |
| 6,014,653 A | * | 1/2000 | Thaler .......................... 706/16 |
| 6,105,015 A | * | 8/2000 | Nguyen et al. ................ 706/26 |
| 6,192,360 B1 | * | 2/2001 | Dumais et al. ................. 707/6 |
| 6,301,572 B1 | * | 10/2001 | Harrison ....................... 706/52 |

OTHER PUBLICATIONS

Constrained Neural Network Based Identification of Harmonic Sources, R. K. Hartana, Member, IEEE & G.G. Richards, Member, IEEE, (1990).*
Harmonic Sources Monitoring and Identification Using Neural Networks, R. K. Hartana, Member, IEEE & G.G. Richards,Member, IEEE, (1990).*
Neural Network for Estimation of Harmonic Components in a Power System, S. Osowski, IEEE Proceeding, Mar. 1992.*
Neural Network Approach of Harmonics Detection, A.A. Mohd Zin, Md. Rukonmuzzaman, H. Shaibon, K.L. Lo, IEEE Catalogue No: 98Ex137 (1998) IEEE.*

(List continued on next page.)

Primary Examiner—John Follansbee
Assistant Examiner—Michael B. Holmes
(74) Attorney, Agent, or Firm—James M. Kasischke; Michael F. Oglo; Jean-Paul Nasser

(57) ABSTRACT

A dynamic memory processor for time variant pattern recognition and an input data dimensionality reduction is provided having a multi-layer harmonic neural network and a classifier network. The multi-layer harmonic neural network receives a fused feature vector of the pattern to be recognized from a neural sensor and generates output vectors which aid in discrimination between similar patterns. The fused feature vector and each output vector are separately provided to corresponding positional king of the mountain (PKOM) circuits within the classifier network. Each PKOM circuit generates a positional output vector with only one element having a value corresponding to one, the element corresponding to the element of its input vector having the highest contribution. The positional output vectors are mapped into a multidimensional memory space and read by a recognition vector array which generates a plurality of recognition vectors.

21 Claims, 12 Drawing Sheets

OTHER PUBLICATIONS

A TwOANN Approach to Frequency and Harmonic Evaluation, L.L. Lai, W.L. Chan, A.T.P. So, Artificial Neural Networks, Jul. 7–9, 1997, Conference Publication No. 440, IEEE 1997.*

Real–Time Frequency and Harmonic Evaluation using Artificial Neural Networks, L.L. Lai, Member, IEEE, C.T. Tse, Member, IEEE, W.L. Chan, Member, IEEE, A.T.P. So, Member, IEEE, IEEE Transactions on Power Delivery, vol. 14, No. 1 Jan. 1997.*

Artificial Neural Networks for Power Systems Harmonic Estimation, Ibrahim El–Amin, Ibrab Arafah, 8$^{th}$ International Conference on Harmonics and Quality of Power ICHQP '98, IEEE/PES and NTUA, Oct. 14–16, 1998.*

A Harmonic Balance Approach for the Qualitive Analysis of Limit Cycles Occurring in CNNs, Marco Gilli, CNNA'96: Fourth IEEE International Workshops on Cellular Neural Networks and their AQpplication, Jun. 24–26, 1996, IEEE.*

Harmonic Analysis of Homogeneous Networks, William J. Wolfe, Jay A. Rothman, Edward H. Chang, William Aultman, and Garth Ripton, Member, IEEE, IEEE Transactions on Neural Networks, vol. 6, No. 6, Nov. 1995, IEEE.*

AQ Combination of Peicewise Harmonic Balance technique and neural Network for Analyzing Active Antenna, Jaizong Zhang, Yunyi Wang and Xiangdong Wang, (1996) IEEE.*

Harmonic Competition: A Self–Organizing Multiple Criteria Optimization, Yasuo Matsuyama, Senior Member, IEEE, IEEE Transactions on Neural Networks, vol. 7, No. 3, May 1996, IEEE.*

Harmonic Estimation in a Power System using Adaptive Perceptions, P.K. Dash, D.P. Swain, A. Routray, and A.C. Liew, IEEE Proc.–Gener. Transm. Distrib., vol. 143, No. 6, Nov. 1996, IEEE.*

* cited by examiner

DYNAMIC MEMORY PROCESSOR

CROSS-REFERENCE TO RELATED APPLICATIONS

This patent application is co-pending with related patent applications entitled Neural Directors (Navy Case No. 74988), Neural Sensors (Navy Case No. 74989) and Static Memory Processor (Navy Case No. 75279), by the same inventor as this patent application.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to the field of electronic neural networks, and more particularly to a new architecture for neural networks having a plurality of hidden layers, or multi-layer neural networks, and further to new methodologies for providing supervised and unsupervised training of neural networks constructed according to the new architecture.

(2) Description of the Prior Art

Electronic neural networks have been developed to rapidly identify patterns in certain types of input data, or to accurately classify the input patterns into one of a plurality of predetermined classifications. For example, neural networks have been developed which can recognize and identify patterns, such as the identification of hand-written alphanumeric characters, in response to input data constituting the pattern of on/off picture elements, or "pixels," representing the images of the characters to be identified. In such a neural network, the pixel pattern is represented by, for example, electrical signals coupled to a plurality of input terminals, which, in turn, are connected to a number of processing nodes, or neurons, each of which is associated with one of the alphanumeric characters which the neural network can identify. The input signals from the input terminals are coupled to the processing nodes through certain weighting functions, and each processing node generates an output signal which represents a value that is a non-linear function of the pattern of weighted input signals applied thereto. Based on the values of the weighted pattern of input signals from the input terminals, if the input signals represent a character which can be identified by the neural network, one of the processing nodes which is associated with that character will generate a positive output signal, and the others will not. On the other hand, if the input signals do not represent a character which can be identified by the neural network, none of the processing nodes will generate a positive output signal. Neural networks have been developed which can perform similar pattern recognition in a number of diverse areas.

The particular patterns which the neural network can identify depend on the weighting functions and the particular connections of the input terminals to the processing nodes, or elements. As an example, the weighting functions in the above-described character recognition neural network essentially will represent the pixel patterns which define each particular character. Typically, each processing node will perform a summation operation in connection with the weight values, also referred to as connection values or weighting values, representing the weighted input signals provided thereto, to generate a sum that represents the likelihood that the character to be identified is the character associated with that processing node. The processing node then applies the non-linear function to that sum to generate a positive output signal if the sum is, for example, above a predetermined threshold value. The non-linear functions which the processing nodes may use in connection with the sum of weighted input signals are generally conventional functions, such as step functions, threshold functions, or sigmoids. In all cases the output signal from the processing node will approach the same positive output signal asymptotically.

Before a neural network can be useful, the weighting functions for a set of the respective input signals must be established. In special cases, the weighting functions can be established a priori. Normally, however, a neural network goes through a training phase, in which input signals representing a number of training patterns for the types of items to be classified (e.g., the pixel patterns of the various hand-written characters in the character-recognition example) are applied to the input terminals, and the output signals from the processing nodes are tested. Based on the pattern of output signals from the processing nodes for each training example, the weighting functions are adjusted over a number of trials. Once trained, a neural network can generally accurately recognize patterns during an operational phase. The degree of success is based in part on the number of training patterns applied to the neural network during the training stage and the degree of dissimilarity between patterns to be identified. Such a neural network can also typically identify patterns which are similar to the training patterns.

One of the problems with conventional neural network architectures as described above is that the training methodology, generally known as the "back-propagation" method, is often extremely slow in a number of important applications. Also, under the back-propagation method, the neural network may provide erroneous results which may require restarting the training. In addition, even after a neural network has been through a training phase, confidence that the best training has been accomplished may sometimes be poor. If a new classification is to be added to a trained neural network, the complete neural network must be retrained. Further, the weighting functions generated during the training phase often cannot be interpreted in ways that readily provide understanding of what they particularly represent.

SUMMARY OF THE INVENTION

Accordingly, it is an object of the present invention to provide a new and improved neural network architecture for use in pattern recognition in which the weighting functions may be determined a priori.

Another object of the present invention is to provide a neural network architecture which can be trained with a single application of an input data set.

A further object of the present invention is to provide a neural network architecture which can be used in time varying pattern recognition.

Other objects and advantages of the present invention will become more obvious hereinafter in the specification and drawings.

In accordance with the present invention, a new neural network architecture, referred to hereinafter as a dynamic memory processor, is provided. The dynamic memory processor receives inputs from a sensor and provides low dimensional pattern recognition or classification identifiers for the inputs. The dynamic memory processor provides pattern recognition for time variant inputs, such as sound signal inputs. The dynamic memory processor is part of a new neural network technology that is constructed rather then trained. Since the words "neural networks" often connote a totally trainable neural network, a constructed neural network is a connectionist neural network device that is assembled using common neural network components to perform a specific process. The constructed neural network assembly is analogous to the construction of an electronic assembly using resistors, transistors, integrated circuits and other simple electronic parts. A constructed neural network is fabricated using common neural network components such as processing elements (neurons), output functions, gain elements, neural network connections of certain types or of specific values and other artificial neural network parts. As in electronics, the design goal and the laws of nature such as mathematics, physics, chemistry, mechanics, and "rules of thumb" are used to govern the assembly and architecture of a constructed neural network. A constructed neural network, which is assembled for a specific process without the use of training, can be considered equivalent to a trained neural network having accomplished an output error of zero after an infinite training sequence. Although there are some existing connective circuits that meet the design criteria of a constructed neural network, the term "constructed neural network" is used herein to differentiate this new neural technology which does not require training from the common neural network technology requiring training. A constructed neural network can consist of a neural network module, such as a neural director, a neural sensor, or a vector decoupler, and may contain one or more modules to develop a specific neural architecture. The construction and functioning of some or all of these modules will be further explained hereinafter. Combinations of neural network modules in the present invention lead to a unique neural architecture producing a distributed connectionist computational process. It is noted that one embodiment of the present invention requires training of two neural network modules with a single application of an input stimulus, but does not require retraining of previously learned input stimuli when being trained for a new input stimulus.

Constructed neural networks can be embodied in analog or digital technologies, or in software. Today one can find a blurring between the boundaries of analog and digital technologies. Some of the classic analog processing is now found in the realm of digital signal processing and classic digital processing is found in analog charged couple devices and sample and hold circuits especially in the area of discrete time signals and delay lines.

One of the differences between a classic neural network device and a constructed neural network device is in the internal processing of recognition information. The neural network processing of a multilayer constructed neural network device, or of a subsection of a constructed neural network device, lies within a multiplicity of concentric multidimensional spherical spaces. This can simply be envisioned as an "onion" where each spherical onion layer represents a spherical multidimensional layer populated with neural network processors. A multilayer constructed neural network device processes an input vector, which may be modified as it propagates through each layer by an alteration of the vector's direction in its multidimensional space. The vector's direction in its multidimensional space is used in the recognition of the vector's representation. The vector's altered direction in its spherical multidimensional space compared to the vector's unaltered direction can be seen as a nonlinearity in a constructed neural network. The classic neural network device primarily uses nonlinear neurons for its nonlinear processing in an undefined subspace. In addition to the possible use of nonlinear neurons for its nonlinear processing, the constructed neural network device in a multidimensional spherical subspace primarily uses a second form of nonlinearity as will be discussed further below.

One of the components utilized in constructing a dynamic memory processor is a neural director. In brief, a neural director receives an input vector X comprising "I" input components $X_i$ and generates in response thereto, an output vector Y comprising "J" output components $Y_j$, where "I" and "J" are the neural director's input and output dimensions. The neural director has an input processing node layer comprised of "I" processing nodes and an output processing node layer comprised of "J" processing nodes. Each output processing node receives the outputs from the input processing nodes to which a "j" subset of weighting values w(i,j) has been applied and generates one of said output components $Y_j$ representing a linear function in connection therewith. The weighting values w(i,j) contain a unique internal representation of a uniform spatial distribution.

A neural director can be constructed to be one of two types, designated type 1 or type 2. The two types differ in what may be termed "spatial linearity". In addition to classic linearity, i.e., the use of non-linear output functions in the neural circuit, spatial linearity includes a "linearity in space". In a fully populated single layer neural network which has "I" input processing nodes and "J" output processing nodes, each of the output processing nodes will contain "I" weight values. The "I" weight values of each processing node can be considered a vector of "I" components in an "I" dimensional space. One of the many important characteristics of a constructed neural network is that a classification of an input pattern is greatly defined by a vector's direction in a multidimensional space. Thus, spatial linearity/nonlinearity affects the internal process of a dynamic memory processor. An angular relationship between input and output vector pairs can be used to define spatial linearity. A network is linear in space when the angles between all different vector pairs are the same in the output space as they are in the input space regardless of the dimensionalities of the spaces. A network is nonlinear if it is either classically and/or spatially nonlinear. A spatial nonlinearity causes an input vector pair to diverge in direction in the output space and is analogous to a system nonlinearity in chaos theory where two similar initial condition points diverge over time for each cycle through the nonlinear system. A neural director type 1 is linear in both its neural circuit, i.e., classically linear, and in its space, i.e., spatially linear. Generally, a neural director type 2 is classically linear but spatially nonlinear, though it will be understood that either classic or spatial nonlinearity will result in a neural director type 2. When compared to a neural director type 1 of the same input and output dimensions, a neural director type 2 nonlinearly shifts an input vector away from the output direction which one would anticipate using the neural director type 1. One embodiment of a neural director type 2 produces a nonlinear gradient between two poles in its multidimensional output space, one pole lying in the center of a sub space that is directed by all positive elements and the other pole being the opposite polarity.

Spatial nonlinearity is a parameter for a constructed neural network connectionist device which affects the recognition differentiation between similar input patterns. Reduced to its most basic concept, a constructed neural network senses features from a specific input pattern to provide a deterministic direction through a connecting circuit as a feature vector. This deterministic direction in a multidimensional space is the information that is used for the recognition and classification of the pattern. The spatial nonlinearities of the type 2 neural director provide a process that allows the discrimination of finer details in the recognition of an input pattern. Spatial nonlinearity is the result of a deterministic change in a vector's direction in its multidimensional space relative to its intended direction in a linear space. Spatial nonlinearities are caused by the partial restriction of linear coupling of vector data between multidimensional spaces. The dimensionalities between these spaces may be different or the same. While most conventional neural networks demonstrate a spatial nonlinearity, the spatial nonlinearity is primarily caused by the use of nonlinear neurons.

The neural director type 1 has several advantages in performing different operations depending upon its application in a network. A neural director type 1 has the ability to linearly transform a vector from one set of dimensions to the same or that of another set of dimensions. The type 1 neural director can fuse separate data paths into a single vector as each output element of the vector contains a composition of all input elements of the input data, e.g., a neural director with equal input and output dimensions. The type 1 neural director may also distribute input data into different layers of like data and can expand its input data into higher dimensions, where the input data can be sensed at a higher resolution than it can in its lower dimension. Although the dimensions are not totally independent, the dimensional independency can be increased when the type 1 neural director is coupled with a spatially nonlinear device. The neural director type 1 can represent a generalized matched filter which contains all possible combinations of input patterns due to its distributed connection set. The type 1 neural director can linearly expand input data or can use nonlinear output functions, which when applied to a conventional neural network with the original data, or with the original data as the neural director input in lieu of the original data alone, will make the conventional network learn faster. Depending on the resolution chosen for the internal representation of the uniform spatial distribution, a neural director type 1 may be called a "near" ideal neural director type 1. A near ideal neural director type 1 remains linear in its neural circuit but it is slightly nonlinear in space because the position of a vector in the neural director's output space will be altered relative to the vector's ideal position in a linear space. Used in a multilayer neural director, the near ideal neural director type 1, without other nonlinearities, increases the recognition resolution of similar input patterns. Unless indicated otherwise, the neural directors used herein are type 1 neural directors.

The dynamic memory processor utilizes combinations of neural directors to form a multi-layer harmonic neural network, a classifier network, an integration neural network and a word map neural network. The pattern to be recognized is input into, or is sensed by, a neural sensor which generates a fused feature vector. The fused feature vector is then received by a multi-layer harmonic neural network which generates output vectors aiding in the discrimination between similar patterns. The fused feature vector and each output vector from its corresponding multi-layer harmonic neural network are separately provided to corresponding positional king of the mountain (PKOM) circuits within the classifier network. Each PKOM circuit generates a positional output vector with only one of its elements having a value corresponding to an active output of one, this element corresponding to the element of the fused feature vector, or output vector, having the highest contribution in its respective vector. All other elements of the positional output vector have a value corresponding to zero (no output). The positional output vectors are mapped into a multidimensional memory space, thus the memory space is sparsely populated with active outputs corresponding to the highest contributing elements. A set of active outputs is called a memory vector. As time progresses, a multiplicity of memory vectors are produced by temporal variations in the input pattern. An array of recognition vectors read the memory vector space, activating probability connections and their "integrating" neuron to generate one of a class of likelihood outputs to a class PKOM which outputs classification identifiers for the input pattern. For each potential class, or set of features of the input pattern, the class PKOM provides output values corresponding to the respective likelihood of the features, with the class whose likelihood is the highest having the maximum asserted output value. Thus the classification identifiers provide the desired recognition of the input pattern. In the case of a sound pattern, two neural sensors are utilized, one to provide a fused feature vector for the envelope signal of the sound pattern and the other providing a fused feature vector for the tonal signal of the sound pattern. The envelope fused feature vector and the tonal fused feature vector are then each separately received by a corresponding memory processor. The classification identifiers for the envelope and tonal signals are then provided to a plosive and tonal neural network. The class likelihood outputs of the plosive and tonal neural network are then provided to a word map neural network which outputs classification identifiers for the input pattern, or, in the case of a sound input pattern, the input word.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
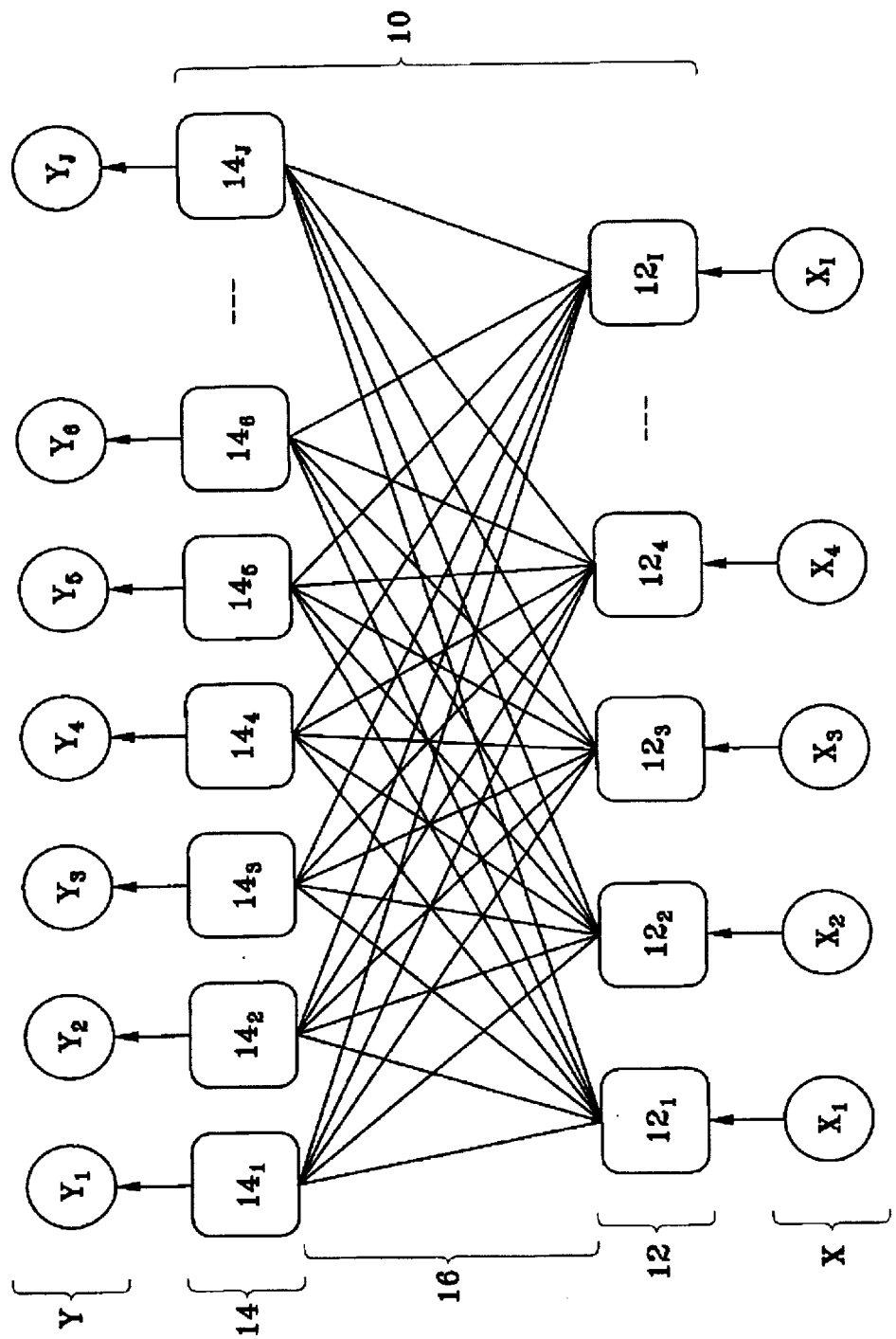
FIG. 1 is a general or neural schematic illustrating a fully populated neural director.

Referring now to FIG. 1, there is shown a general neural schematic illustrating a neural director 10 constructed in accordance with the invention. Neural director 10 includes an input processing node layer 12, an output processing node layer 14 and a set of connections, or weighting set w(i,j), shown as 16 in FIG. 1. An input vector X includes a plurality of input signals $X_1$ through $X_I$, comprising components $X_i$ of the input vector X. Input processing node layer 12 has a corresponding plurality of input processing nodes $12_1$ through $12_I$ each input processing node $12_i$ receiving corresponding input signal $X_i$.

Each node $12_i$ of the input processing node layer 12 generates a processed signal which it couples to each one of a plurality of output processing nodes $14_1$ through $14_J$, as indicated by weighting set 16. The number "I" of input processing nodes $12_i$ and the number "J" of output processing nodes $14_j$ are the input and output dimensions of the neural director 10. In general, the value of "J" is equal to or greater than the value of "I". The processed signals generated by each input processing node $12_i$ represent a value reflecting a predetermined linear function of the input signal $X_i$. All of the input processing nodes $12_i$ preferably use the same linear function, but apply different weighting values to the function in accordance with the weighting set w(i,j) 16.

Each output processing node $14_j$ of the output processing node layer 14 also generates an output signal $Y_j$, comprising the output vector elements $Y_1$ through $Y_J$ of output vector Y. Each output processing node $14_j$ effectively receives the weighted values of processed signals from the input processing nodes $12_i$ connected thereto according to the weighting set w(i,j) 16, generates a sum of the weighted values and generates in response to the sum an output signal $Y_j$ representing a value reflecting a function of the generated sum. All of the output processing nodes $14_j$ use the same function, but the function used by the output processing nodes $14_j$ may differ from the linear function used by the input processing nodes $12_i$.

As described above, the neural director 10 is constructed, rather than trained as in a conventional neural network. Accordingly, the weighting set w(i,j) 16 is determined a priori, and not in relation to any training data. As noted above, the input signals received into processing node layer 12 may be viewed as a vector X, having components $X_i$, which is a vector of "I" dimensions. Similarly, the outputs provided by the output processing node layer 14 may be viewed as a vector Y having components $Y_j$, which is a vector of "J" dimensions where "J" is equal to or greater than "I". Each of the output processing nodes $14_j$ contains an "I" dimensional vector of weighted values, thus all the weighted values in the neural director 10 can be represented by a "J" array of "I" dimensional vectors, or the weighting set w(i,j) 16.

An "I" dimensional vector of weight values for a typical input processing node $12_i$ is in a normalized form of a unit vector. Each of the represented unit vectors has a specific relationship relative to its nearest neighboring unit vectors: the cosine of the angle between any two adjacent or nearest neighbor vectors is a constant. These nearest neighbor vector requirements will produce a neural director 10 with a weighting set w(i,j) 16 that has the same values as a set of "J" unit vectors of "I" dimensions which are uniformly distributed throughout an "I" dimensional unit sphere. Each input processing node $12_i$ is associated with a common dimension "i" of the weighting set w(i,j) 16.

The neural director 10 weight values of the weighting set w(i,j) 16 contain a unique internal representation for a relative spatial distribution. The weighting set w(i,j) 16 for neural director 10 with an "I" input dimension and a "J" output dimension is given as:

$$w(i,j) = ka(i,j)|S^*, \text{ where} \tag{1}$$

a(i,j) is a "J" dimensional array of unit vectors of "I" dimensions;

k is a constant which represents a non unit vector magnitude of a weighting set w(i,j) 16 as compared to the vector set a(i,j); and

|S* is defined as a symbol to represent the uniform distribution of the "J" unit vectors throughout a unit sphere of "I" dimensions.

Thus the cosine value between any two adjacent unit vectors is a constant everywhere in the unit sphere. The cosine test is a metric to measure the uniformity of the distribution. For a typical k value of one, w(i,j)=a(i,j). Thus the weight values to an output processing node "j" are the same numerical values as the "i" elements of the appropriate "j" unit vector.

A neural director that contains equal input and output dimensions has an additional requirement in its construction, the additional requirement being a coordinate axis shift between the input space and the output space. The coordinate axis shift is defined by the following description. The position of the first output coordinate axis is at a 45 degree angle relative to any and each pair of input coordinate axes. The remaining output coordinate axes are all orthogonal to said first output coordinate axis.

A general outline for the design of an "I" input dimension and a "J" output dimension neural director 10 is to fully pack a unit sphere with unit vectors of "I" dimensions. A packing cosine is chosen to produce an optimum high packing density with a minimum size of the array of vectors packed. When the sphere is judged "fully packed" the array of vectors is saved to allow an at least one iteration of vector selection. An input of a culling cosine parameter is used to estimate the correct final density of the "J" vectors in the unit sphere. A unit vector from the packed array is chosen and all unit vectors lying within the culling cosine value of the chosen unit vector are culled, or deleted from the packed array. The nearest remaining unit vector is chosen, culling about that vector is performed and the process is repeated until no remaining vector lies within the culling cosine value of any other remaining vector. Values for the culling cosine can be iteratively chosen until the remaining vectors produce the uniform distribution required by the design of the neural director.

Figure 2:
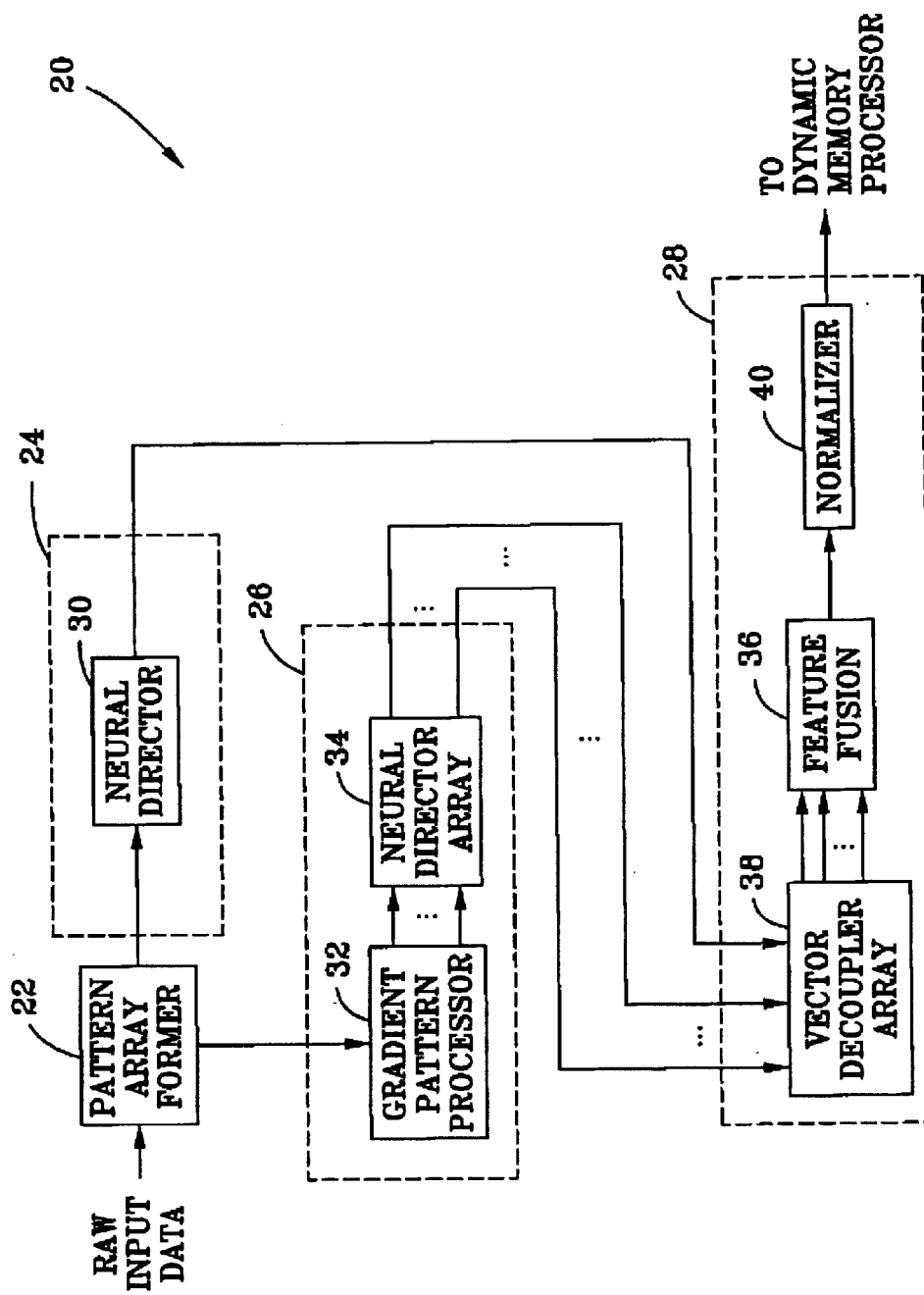
FIG. 2 is a functional block diagram of an illustrative neural sensor used to provide the fused feature vector input to the dynamic memory processor of the present invention.
Figure 4:
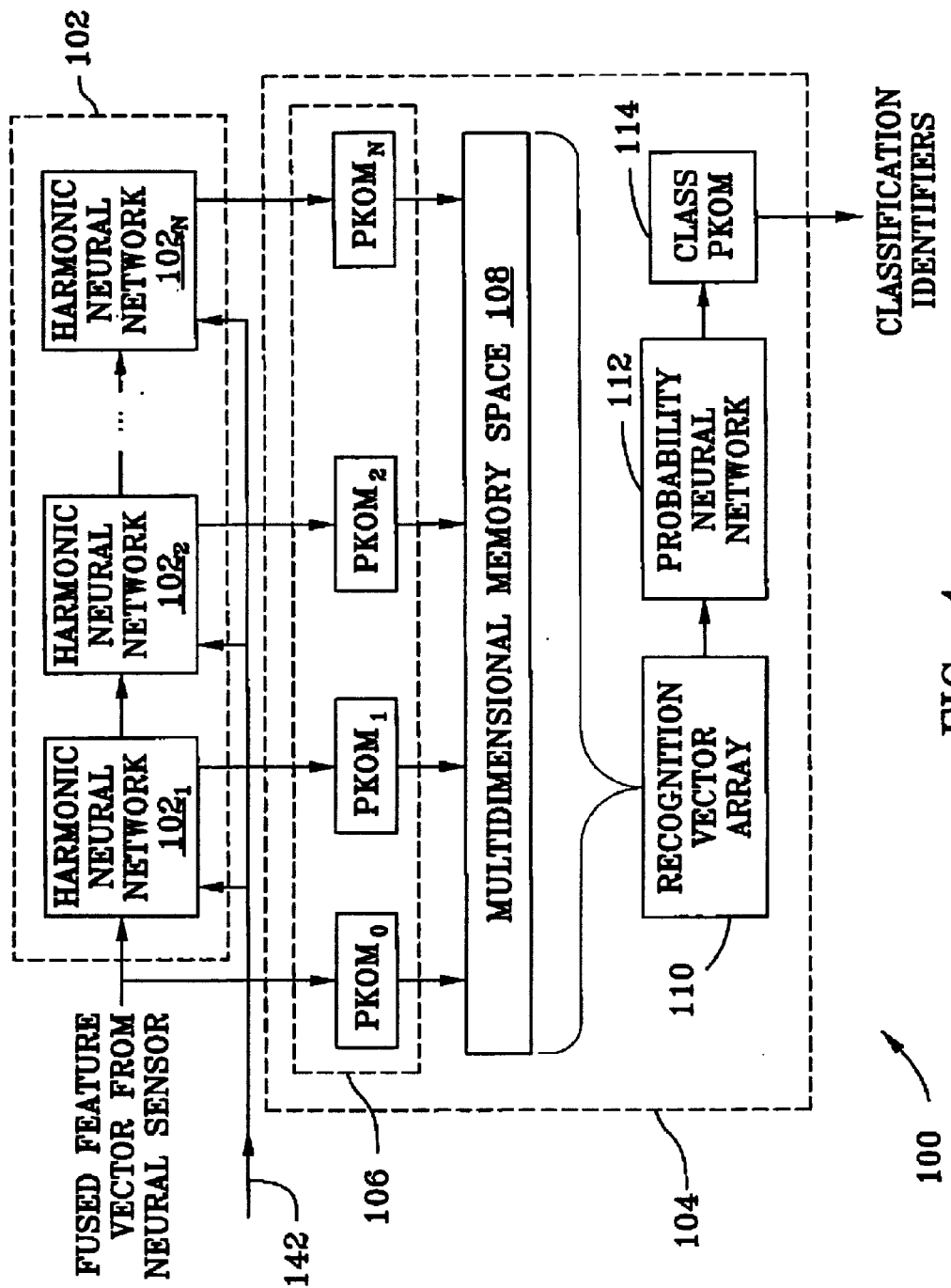
FIG. 4 is a functional block diagram of an illustrative dynamic memory processor.

Referring now to FIG. 2, a block diagram of general neural sensor 20 is shown. The neural sensor 20 receives temporal input data in the form of unpreprocessed real world data which defines a pattern, or patterns, e.g., sound data, and generates a sequential output of at least one fused feature vector for the pattern(s). Through its constructed neural network architecture, neural sensor 20 senses patterns in the raw input data, which determines at least one direction of the fused feature vector in a multidimensional space. The fused feature vector contains information used in classifying the input pattern. The input data may be a one, two, or multidimensional pattern of data relative to a period of time. The dimensionality of the input pattern is dependent upon the specific architecture of the neural sensor, e.g., a sound signal will likely include both tonal and envelope data for each discrete time interval of the signal. In the block diagram of FIG. 2, pattern array former 22 organizes the raw input data into the proper array format for use in the neural sensor. Neural sensor 20 also includes two sections, a first order processing section 24 and a second order processing section 26, both of which receive the pattern array from array former 22 and generate feature vectors illustrative of features of the input data being classified. In addition, neural sensor 20 includes vector fusion section 28 which receives the feature vectors from the first and second order processing sections 24 and 26 and generates a single fused feature vector which is provided to the dynamic memory processor of the present invention as shown in FIG. 4. The dynamic memory processor generates a pattern classification for the input data to provide pattern recognition. Generally, processing sections 24 and 26, together with fusion section 28, increase input data dimensionality for improved pattern sensitivity, while the dynamic memory processor reduces the data dimensionality into a specific class.

First order processing section 24 includes first order neural director 30 and may include additional elements (not shown) depending on the input pattern to be recognized. Neural director 30 generates an output vector which has an increased dimensionality from the vector representing the pattern array, which aids in discriminating between similar patterns. In parallel with first order processing section 24, second order processing section 26 receives the pattern array from array former 22. Second order processing section 26 includes gradient pattern processor 32 and neural director array 34. Gradient pattern processor 32 forms gradient vectors from the elements of the pattern array. The gradient vector for each element reflects selected differences between that element and its neighboring elements, each gradient containing multiple local frequency or spatial frequency data depending on the form of the raw input data. The number of neighboring elements used to form the gradient vector as well as the differences selected will depend on the specific embodiment of the neural sensor and the structure of the pattern array. The total number "S" of gradient vectors formed generally corresponds to the number of elements in the pattern array. Neural director array 34 has a corresponding number of neural directors, such that each neural director of neural director array 34 is coupled to one gradient vector. As with neural director 30, the outputs of the neural directors of array 34 have an increased dimensionality from their input gradient vectors, which aids in discriminating between similar gradients.

The output vector from first order processing section 24 represents overall features in the input pattern and the output vectors from second order processing section 26 represent features in the gradients in the input pattern. All of the output vectors are coupled to vector fusion section 28, which fuses the output vectors into a single feature vector for provision to the dynamic memory processor. Fusion section 28 includes feature fusion neural director 36, and may also include vector decoupler array 38 and vector normalizer 40. Feature fusion neural director 36 is a standard neural director as described above, having the separate feature vectors as its input array "X" and a fused feature vector as its output array "Y", the fusion being the coupling of each input element with all output elements via the weighting set w(i,j), as is standard for a neural director. Vector decoupler array 38 serves to adjust the values of the feature vectors received from processing sections 24 and 26 by removing any fixed offset which may have been present in the input data. For example, an image on an artificial retina may produce a signal output for each pixel in proportion to the intensity of the local area of the image. Classically, each output is a uni-polar signal, i.e., zero for black (full dark) and a maximum value for white (full light). The image information is contained in the variance of the signal array, or vector, and not the absolute values of the signal array. If the average signal of all pixels is subtracted from each pixel of the signal array, the array information becomes the variance of the image information. Vector decoupler array 38 provides this process in a constructed neural network.

Figure 3A:
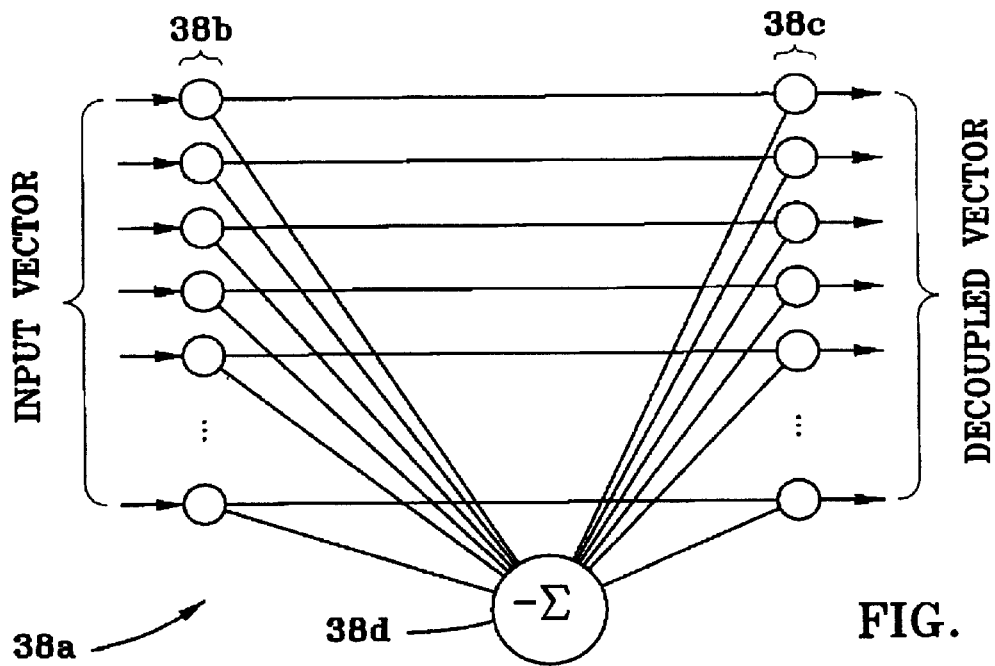
FIG. 3a is a neural schematic illustrating a vector decoupler.

Referring now to FIG. 3a, a neural schematic for one decoupler 38a of decoupler array 38 is shown. Decoupler 38a essentially comprises a plurality of decoupler input elements 38b, a corresponding plurality of decoupler output processing elements 38c and averaging element 38d. Each connection value between decoupler input processing elements 38b and averaging element 38d is equal to the inverse of the number of elements in the input vector for decoupler 38a. Thus averaging element 38d receives and sums the element value multiplied by this inverse value from each input element 38b, the output of averaging element 38d having a negative output function, thus being the average negative element value. Decoupler output processing elements 38c sum the negative average provided by averaging element 38d from the component values provided by the decoupler input processing elements 38b to output the components of a decoupled vector.

Figure 3B:
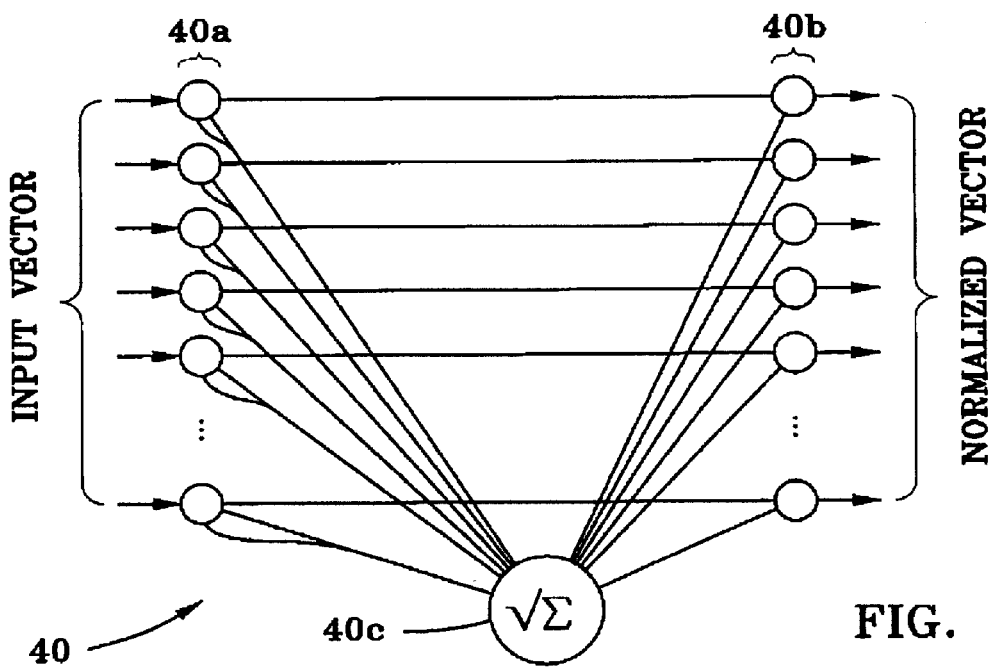
FIG. 3b is a neural schematic illustrating a vector normalizer.

Referring now to FIG. 3b, a neural schematic of normalizer 40 is shown. Normalizer 40 has a structure similar to decoupler 38a. Normalizer 40 comprises a plurality of normalizer input elements 40a and a corresponding plurality of normalizer output processing elements 40b. However, the averaging element 38d of decoupler 38a is replaced with normalizer element 40c. Each normalizer input processing element 40a of normalizer 40 passes a component value of its input vector to a normalizer output processing element 40b and also to normalizing element 40c. The connections between input elements 40a and normalizing element 40c are well known sigma-pi connections so as to provide the square of each element value to normalizing element 40c, which sums the squares. The output function of normalizing element 40c obtains the square root of the sum and controls the output function of output processing elements 40b, for an output gain inverse to the normalizing element 40c. The input processing element values are thereby changed such that output processing elements 40b output the components of a normalized vector.

Referring now to FIG. 4, there is shown a block diagram of dynamic memory processor 100. One of the most important processes of dynamic memory processor 100 is as a feed forward neural network device that reduces a multiplicity of high multidimensional vectors into a one dimensional classification representative of said multidimensional vectors' grouped directions in space. Dynamic memory processor 100 receives input data in the form of a set of fused feature vectors from neural sensor 20 of FIG. 2 and classifies the received input data into one of a plurality of classes defining a selected class structure. The dynamic memory processor 100 can be used to recognize vectors from neural sensors for sound, envelope, speech to word, phonic processing and temporal series of visual images. Dynamic memory processor 100 includes multi-layer harmonic neural network 102 and classifier network 104. Multi-layer harmonic neural network 102 includes a series of harmonic neural networks $102_1$ through $102_N$ (generally identified by reference numeral $102_n$), which will be described below in connection with FIG. 5. Generally, each harmonic neural network $102_n$ receives an input vector generated as the output, or feature vector from the preceding harmonic neural network circuit $102_{n-1}$ in the series, with the first harmonic neural network $102_1$ receiving as its input the fused feature vector from neural sensor 20 of FIG. 2. In addition, a neural director output, or feature vector of each harmonic neural network $102_n$ is provided to a corresponding one of the PKOM circuits 106 within classifier network 104, such that $PKOM_n$ receives a feature vector from harmonic neural network $102_n$. In addition, fused feature vector from neural sensor 20 of FIG. 2 is provided to a first $PKOM_0$. PKOM circuits 106 are well known devices, also referred to as Winner-Take-All devices. Each PKOM circuit 106 output is a unitary value at a specific position in its Euclidean output space that represents the most simple major direction of its input vector. Generally, the output of each $PKOM_n$ associated with the dimension for which the feature vector component has the highest value is asserted and all other outputs are negated, i.e., $PKOM_n$ effectively generates an active output of one for the output associated with the dimension, or features, having the highest contribution in the feature vector and a zero, or no output, for outputs associated with other dimensions, or features, of the feature vector.

The asserted and negated $PKOM_n$ outputs populate multidimensional memory space 108 of classifier network 104 such that multidimensional memory space 108 contains a memory vector which is a set of $PKOM_N$ sparse activations. Recognition vector array 110 of classifier network 104 reads multidimensional memory space 108. Recognition vector array 110 contains an array of feature recognition vectors, i.e., sparse spatial sets of connections in a highly dimensional space corresponding to predetermined features which the input pattern may contain. When the memory vector of multidimensional space 108 is read by recognition vector array 110, one or more sets of connections, or feature recognition vectors, become activated upon a matching or near matching of the active memory vector or a subset of the active memory vector. The feature recognition vectors within recognition vector array 110 are provided during a training process for dynamic memory processor 100 as further described in connection with FIG. 9.

Recognition vector array 110 is coupled to probability neural network 112. The probability neural network 112 generates, in response to the output from the recognition vector array 110, a set of probability vectors which represent the probability that particular time varying input data represents a particular set of features. The operation of probability neural network 112 will be further described in connection to FIG. 9.

The activated probability vectors from probability neural network 112 are provided to class PKOM circuit 114 of classifier network 104. Class PKOM circuit 114 generates classification identifier outputs, each associated with a class, or a set of features of the input pattern. The classification identifier output associated with the class, or set of features whose likelihood is the highest will have the maximum asserted value. The classification identifier outputs of class PKOM 114 allow for recognition of the input pattern.

Figure 5:
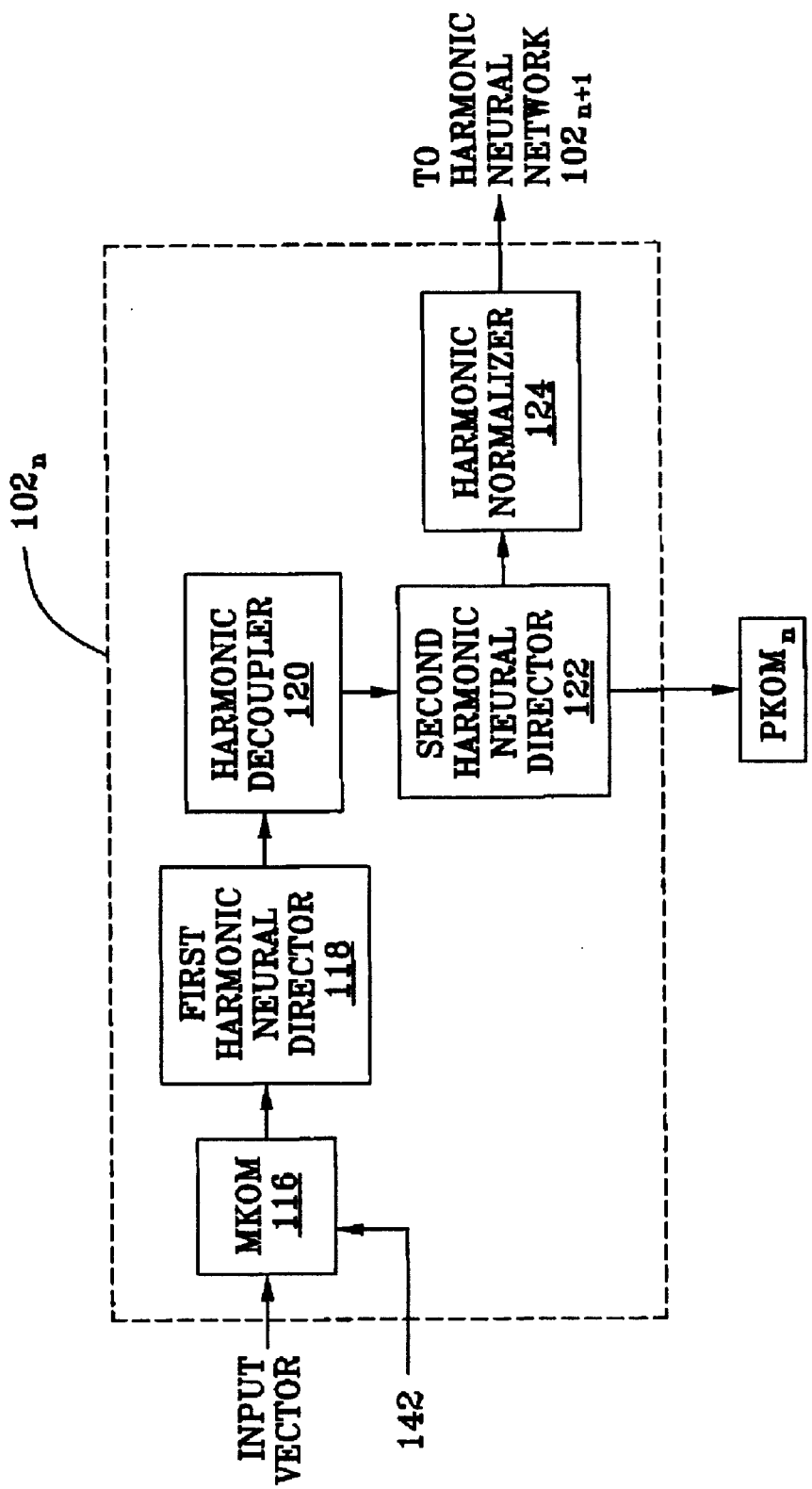
FIG. 5 is a functional block diagram of a harmonic neural network portion of the dynamic memory processor.

Referring now to FIG. 5, a functional block diagram for harmonic neural network $102_n$ is provided. Harmonic neural network $102_n$ receives, as an input vector, the output of the previous harmonic neural network $102_{n-1}$, or, in the case of first harmonic neural network $102_1$, the fused feature vector from neural sensor 20 of FIG. 2. The input vector is received by MKOM 116 of harmonic neural network $102_n$. MKOM 116 generates an ordered set of output elements, each element of the ordered set having a value corresponding to a dimension, or component of the input vector. MKOM 116 is preferably established to provide an output vector whose components are selectively and nonlinearly changed so as to draw the selected set of components towards the dimensionality of the major contributing component. The spatial nonlinear drawing of the MKOM 116 vector towards the major contributing component can be seen by the limit of choosing a smaller and smaller number of a set of components until the selected set is one in which the MKOM becomes a KOM, i.e., having a single output, and by a vector directional comparison between the MKOM input and output vectors for each of the MKOM selected sets. The operation of MKOM 116 and a KOM will be fully described in relation to FIGS. 6–8 below.

The ordered set of elements is provided as input to first harmonic type 2 neural director 118. First harmonic neural director 118 operates in the manner of neural director 10 of FIG. 1 to aid in distinguishing between similar features in the input pattern. As a type 2 neural director, first harmonic neural director 118 is preferably established to provide an output vector whose components are all nonlinearly drawn to draw the vector toward a region of the respectively dimensioned space. The output vector from first harmonic neural director 118 is provided to harmonic decoupler 120, which operates in the manner of decoupler 38 of FIG. 3a to remove any fixed offset which may have been present in the output from MKOM 116. The decoupled vector from harmonic decoupler 120 is provided as input to second harmonic neural director 122, which also operates in the manner of neural director 10 of FIG. 1 to aid in distinguishing between similar features in the input pattern. The output of second harmonic neural director 122 is provided to $PKOM_n$ as shown in FIGS. 4 and 5. Additionally, harmonic normalizer 124, operating in the manner of normalizer 40 of FIG. 3b, normalizes the output of second harmonic neural director 122 for provision to the next harmonic neural network $102_{n+1}$. It can be seen from FIG. 4 that the output from last harmonic neural network $102_N$ is provided only to $PKOM_N$, there being no next harmonic neural network in that case.

Figure 6:
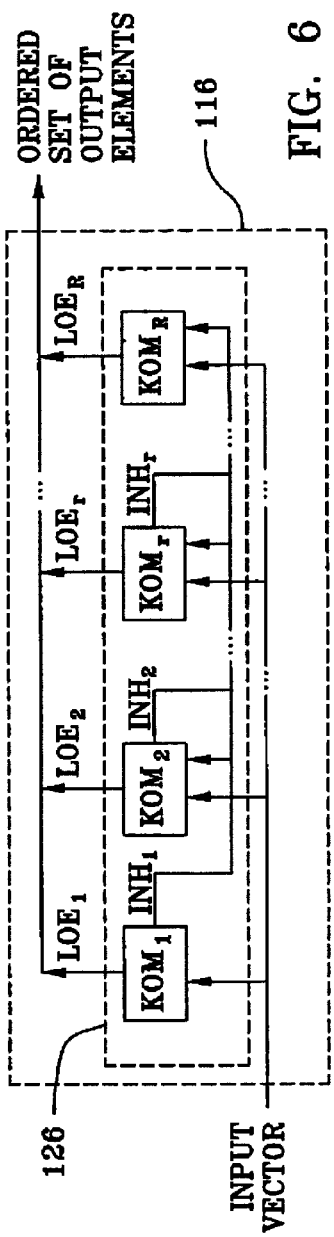
FIG. 6 is a functional block diagram of a multi king of the mountain (MKOM) circuit for use in the harmonic neural network of FIG. 5.

Referring now to FIG. 6, the operation of MKOM 116 in providing the ordered set of output elements is shown as a functional block diagram. MKOM 116 is a nonlinear device that contains equal input and output vector dimensions, but reduces the number of active elements in the output vector. MKOM 116 includes a series of KOM circuits 126, labeled $KOM_1$ through $KOM_R$, or generally $KOM_r$, corresponding to the number "R" of active dimensions, or active elements, of its output vector. The KOM circuits 126 are similar to PKOM circuits, but outputting the value of the element of the input vector having the greatest value, rather than a value of one. The operation of $KOM_r$ will be more fully described in connection with FIG. 7. In the series configuration of FIG.

6, each $KOM_r$ provides a respective local output element $(LOE_r)$ as one component of the ordered set of elements. Each $KOM_r$ receives the original input vector and provides a local output element with a value corresponding to the value of the element of the input vector having the greatest value. However, each $KOM_r$ also provides an element inhibit signal (INH) which is passed to succeeding KOM circuits 126, i.e., $KOM_{r+1}$ through $KOM_R$. The inhibit signal for each $KOM_r$ suppresses the activation of the input node corresponding to the local output element $LOE_r$ of $KOM_r$ in the succeeding KOM circuits 126. Thus, with the suppression of all input nodes corresponding to the "r" previous elements having the greatest values, $KOM_{r+1}$ has a local output element, $LOE_{r+1}$, corresponding to the "r+1"th greatest element.

Figure 7:
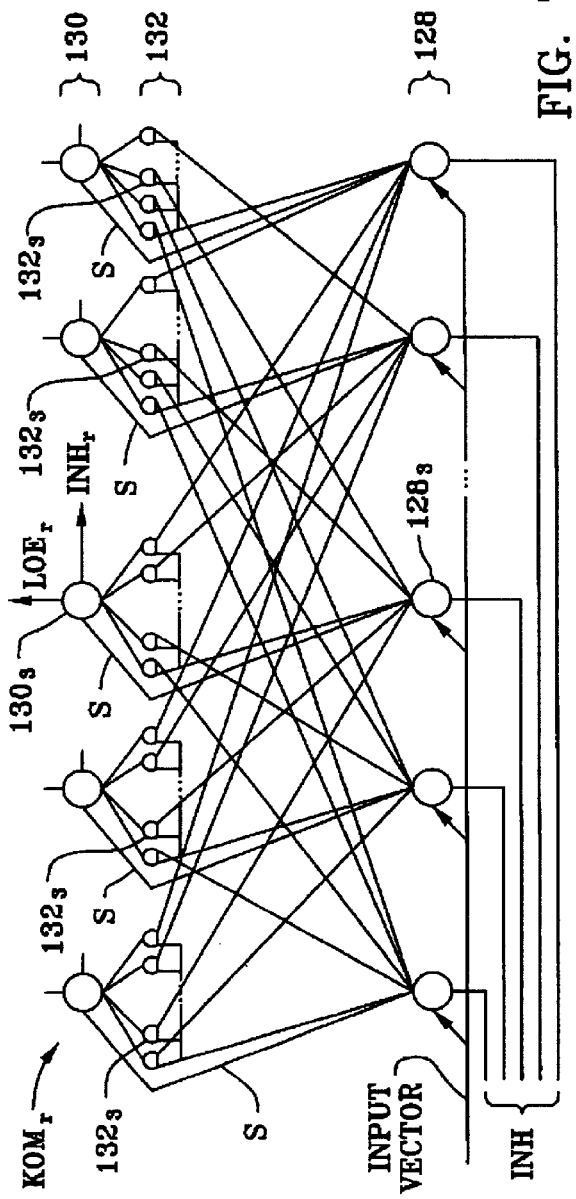
FIG. 7 is a neural schematic illustrating a king of the mountain (KOM) circuit.

Referring now also to FIG. 7, there is shown a neural schematic of $KOM_r$. Each $KOM_r$ contains a plurality of KOM input and output processing elements, 128 and 130, respectively, corresponding to the number of elements in the input vector. Each KOM output processing element 130 has associated with it difference layer nodes 132, the number of difference layer nodes 132 associated with each output element 130 corresponding to one less than the number of input processing elements 128. Each input processing element 128 is connected in a positive global manner to its respective difference layer nodes 132 associated with every other KOM output processing element 130. Each input processing element 128 is further negatively connected in parallel to each of the difference layer nodes 132 associated with its corresponding output processing element 130. In FIG. 7, the difference layer nodes 132 are shown having their positive input to the right and their negative input to the left. To illustrate the connection scheme, connections for input processing element $128_3$ have been denoted in FIG. 7. Input processing element $128_3$ is positively connected to difference layer nodes $132_3$ associated with all output processing elements 130 except output processing element $130_3$, and is negatively connected in parallel to each difference layer node 132 associated with output processing element $130_3$. When any of the outputs of the difference layer nodes 132 associated with one output processing element 130 is a positive value, that output processing element 130 is inhibited, i.e., that output processing element 130 has no output. When all of the outputs of the difference layer nodes 132 associated with one output processing element 130 are negative values, that output processing element 130 is uninhibited, allowing outputs $LOE_r$ and $INH_r$ (shown at output processing element $130_3$ in FIG. 7). Each output processing element 130 is connected to corresponding input processing elements in all succeeding KOM circuits 126 through its INH output connection. Thus, for the case shown in FIG. 7 where output processing element $130_3$ is uninhibited, $INH_r$ inhibits input processing elements $128_3$ in $KOM_{r+1}$ through $KOM_R$. An inhibited input processing element 128 has no output, thus its corresponding output processing element 130 has no output. Finally, each input processing element 128 is connected to its corresponding output processing element 130 via connection "S". Thus, when output processing element 130 is uninhibited, output $LOE_r$ is the value of connection "S" times its input element. All of the connections "S" within a single $KOM_r$ have the same value, with the connections "S" across all KOM circuits 126 comprising shading elements to form a window function for the output of MKOM 116. For example, equal values for connections "S" for all KOM circuits 126 comprises a square window function, i.e., the values of the ordered set of output elements will each be in the same proportion to the values of the input vector elements. In practice, the selected window function, or the variation in "S" between consecutive KOM circuits 126, can be of any selected shape, including a linear ramp, a Hamming window, or a cosine to a power. The only requirements being that the "S" connection for $KOM_1$ provides the full value of its input elements; that each succeeding "S" connection provide successively smaller portions of its input elements; and that the "S" connection for $KOM_R$ provides the smallest and virtually negligible portion of its input elements. The "S" connection values for MKOM 116 are fixed upon construction. It is also noted that the construction of $KOM_r$ shown in FIG. 7 provides an ordered set of positive element values. To obtain an ordered set of both positive and negative values, a second parallel MKOM 116 is required in which the positive and negative connections between input processing elements 128 and difference layer nodes 132 are switched from that shown in FIG. 7. MKOM 116 as described has a fixed degree of nonlinearity which is dependent primarily upon the parameters "R" and "S".

Figure 8:
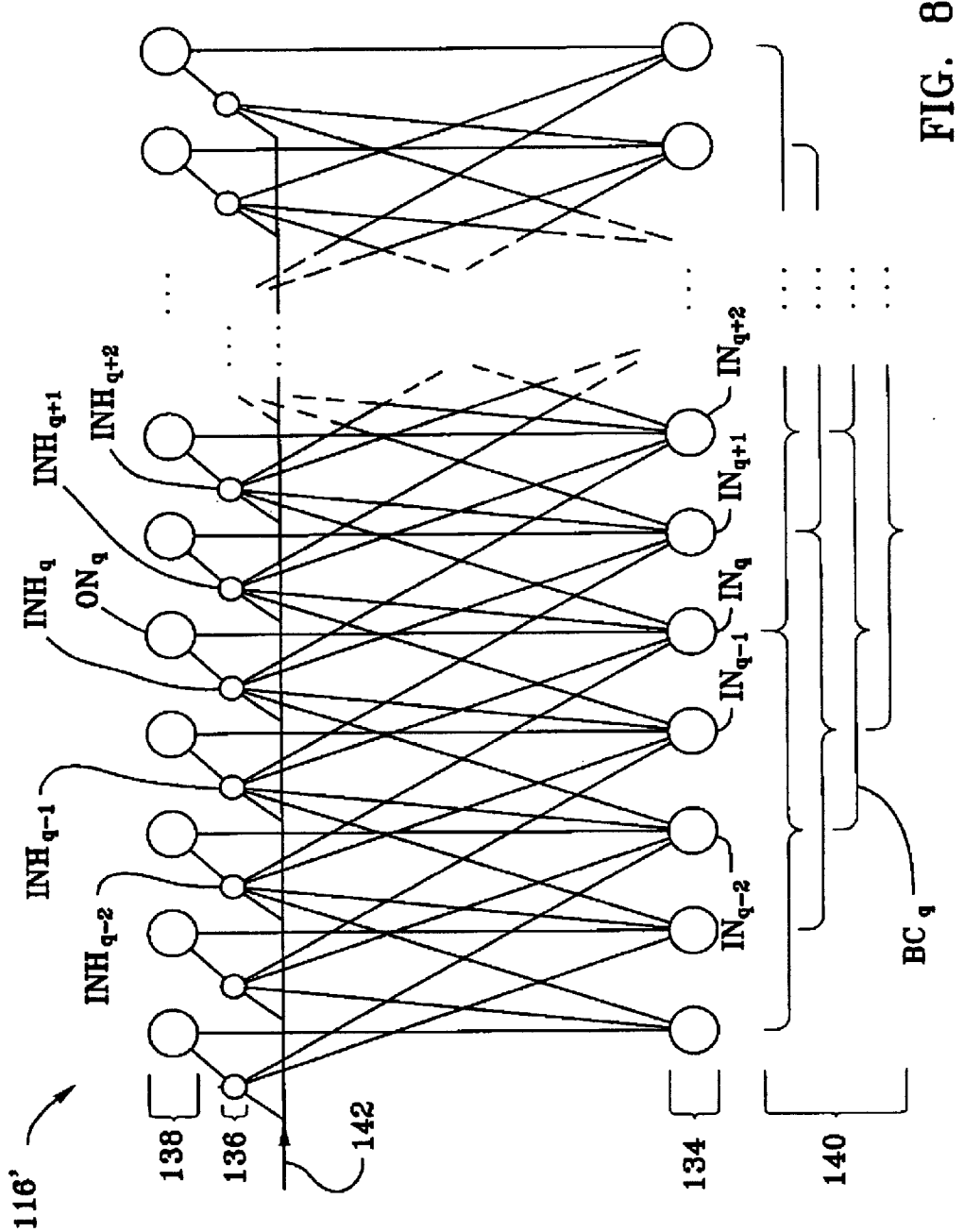
FIG. 8 is a neural schematic illustrating a second embodiment of an MKOM circuit.

In actual applications of dynamic memory processor 100, the input vector would commonly have a large number of elements, thus requiring correspondingly large numbers of connections and nodes for MKOM 116 and $KOM_r$. A preferred embodiment which would reduce the number of connections, and thus decrease the processing requirements, would have a single set of input nodes 128, each receiving its corresponding component of the input vector and interacting only with a limited set of its neighboring input nodes, thus not requiring a full set of input nodes for each $KOM_r$. FIG. 8 provides a neural schematic of MKOM 116' for this preferred embodiment. In comparing MKOM 116' of FIG. 8 with MKOM 116 of FIG. 6, it can be seen that the series of KOM circuits 126 has been eliminated and the neural schematic for this embodiment is greatly simplified. MKOM 116' has three sets of neurons, MKOM input neurons 134, MKOM inhibit neurons 136 and MKOM output processing neurons 138. The number of neurons in each set corresponds to the number of elements in the input vector. The breadth of the nearest neighbor connections, indicated by overlapping brackets 140 in FIG. 8, is a design constraint that dictates the maximum size of the local area of inhibition as will be explained hereafter. This design constraint depends upon the dimension of the input vector and the dimensionality of the output space as defined by the preceding neural director in the signal path, e.g., for MKOM 116 of FIG. 5, the preceding neural director would be second harmonic neural director 122 of harmonic neural network $102_{n-1}$. The design constraint may also be viewed as a ratio between the number of MKOM output neurons 138 and the number of linear independent elements of a basis vector set that could represent the MKOM 116' output space dimensionality. In a very high input/output dimensionality MKOM with a high relative ratio of the dimensionalities, i.e., the output space of the MKOM has a large number of neurons when compared to the dimensionality of the output space, the breadth of the connectivity requirements become very local. For example, the embodiment of FIG. 8 shows the breadth of connectivity as five neurons. Conversely, in a MKOM of low dimensionality and a relatively close ratio of dimensionalities, i.e., the output space has a relatively the same number of neurons when compared to the output space dimensionality, the breadth of connectivities will approach all neurons, thus making the embodiment of FIG. 6 more desirable.

Referring more specifically to FIG. 8, it is to be noted that a two dimensional view of MKOM 116' is portrayed, with sets of nearest neighbor connections 140 shown in a consecutive fashion. In actuality, the connectivities include nearest neighbor connections in a multidimensional space, which are defined by the weighting set vectors w(i,j) of the preceding neural director in the signal path, as previously stated. MKOM 116' of FIG. 8 is shown in a two dimensional depiction to aid in comprehension of the connectivities. The connections for MKOM 116' will be described in relation to one of the MKOM input neurons 134, designated $IN_q$ in FIG. 8. $IN_q$ is connected directly to its corresponding MKOM output neuron 138, designated $ON_q$ in FIG. 8. Each MKOM output neuron 140 is connected to an associated MKOM inhibit neuron 136, designated $INH_q$ for MKOM output neuron $ON_q$, through a negative unit connection. In addition, MKOM input neuron $IN_q$ is connected to the MKOM inhibit neurons, $INH_{q-2}$, $INH_{q-1}$, $INH_{q+1}$, $INH_{q+2}$, etc., within its breadth of connectivity, shown as brackets $BC_q$ in FIG. 8, and similarly, MKOM inhibit neuron $INH_q$ is connected to the MKOM input neurons, $IN_{q-2}$, $IN_{q-1}$, $IN_{q+1}$, $IN_{q+2}$, etc. It is to be noted that, as the preceding neural director is a constructed neural network, the weighting set is known, such that the nearest neighbors encompassed within the breadth of connectivity $BC_q$, can be determined. MKOM output neuron $ON_q$ has an output activation function that is linear for all positive values and zero for all others. The input activation rule for MKOM inhibit neurons 136 operates in the manner of a "diode OR", i.e., for $INH_q$, only the highest input activation from MKOM input neurons $IN_{q-2}$, $IN_{q-1}$, $IN_{q+1}$ and $IN_{q+2}$ passes to output neuron $ON_q$. In addition, inhibit neurons 136 are each connected to external control 142, which is also indicated in FIGS. 4 and 5. For the embodiment of FIG. 8, external control 142 adjusts the output function gain for inhibit neurons 136. For example, a high inhibit value will produce a single output of the highest activation with an activation a proportion of the value of the preceding, or input, neural director. An inhibit value of zero produces no inhibition and thus, the positive output activations produce the same direction output vector as the positive activations of the input neural director. External control 142 can be seen to control the degree of nonlinearity exhibited by MKOM 116'. An input vector to MKOM 116' with an inhibit value at external control 142 will produce an activation pattern in the MKOM 116' output space where the maximum activated output neuron, e.g., $ON_q$, and its nearest neighbors have a close match to the input pattern. As all other output neurons 138 are lower in output value than maximum output neuron $ON_q$ by definition, a proportional inhibit signal to all $ON_q$ nearest neighbors will reduce their outputs. The $ON_q$ nearest neighbor activations in turn inhibit other lesser neuron outputs (their nearest neighbors), and so on until all active neurons are covered with an inhibit action without any direct connection from the maximum activated output neuron $ON_q$. Unlike MKOM 116 of FIG. 6, where a window function is chosen for connections "S", external control 142 of MKOM 116' produces a natural window function. Like MKOM 116 of FIG. 6, a polarity reversal of MKOM 116' is required to produce an ordered set of negative values. With a parallel MKOM 116' of reversed polarity, an inhibit value of zero produces no inhibition and the output activations produce the same direction output vector as the input neural director.

While the architectural components of dynamic memory processor 100 are developed a priori as described above, the connections for the recognition vector array 110, the probability neural network 112 and the corresponding predetermined classifications of class PKOM 114 require training of dynamic memory processor 100 as follows. Learning is accomplished with a single application of an input pattern. An input pattern with a known class is provided to an appropriate neural sensor 20 and the fused feature vector output of neural sensor 20 is then input to dynamic memory processor 100. As described above, PKOM circuits 106 within classifier network 104 populate memory space 108 with a set of sparse activations.

Figure 9:
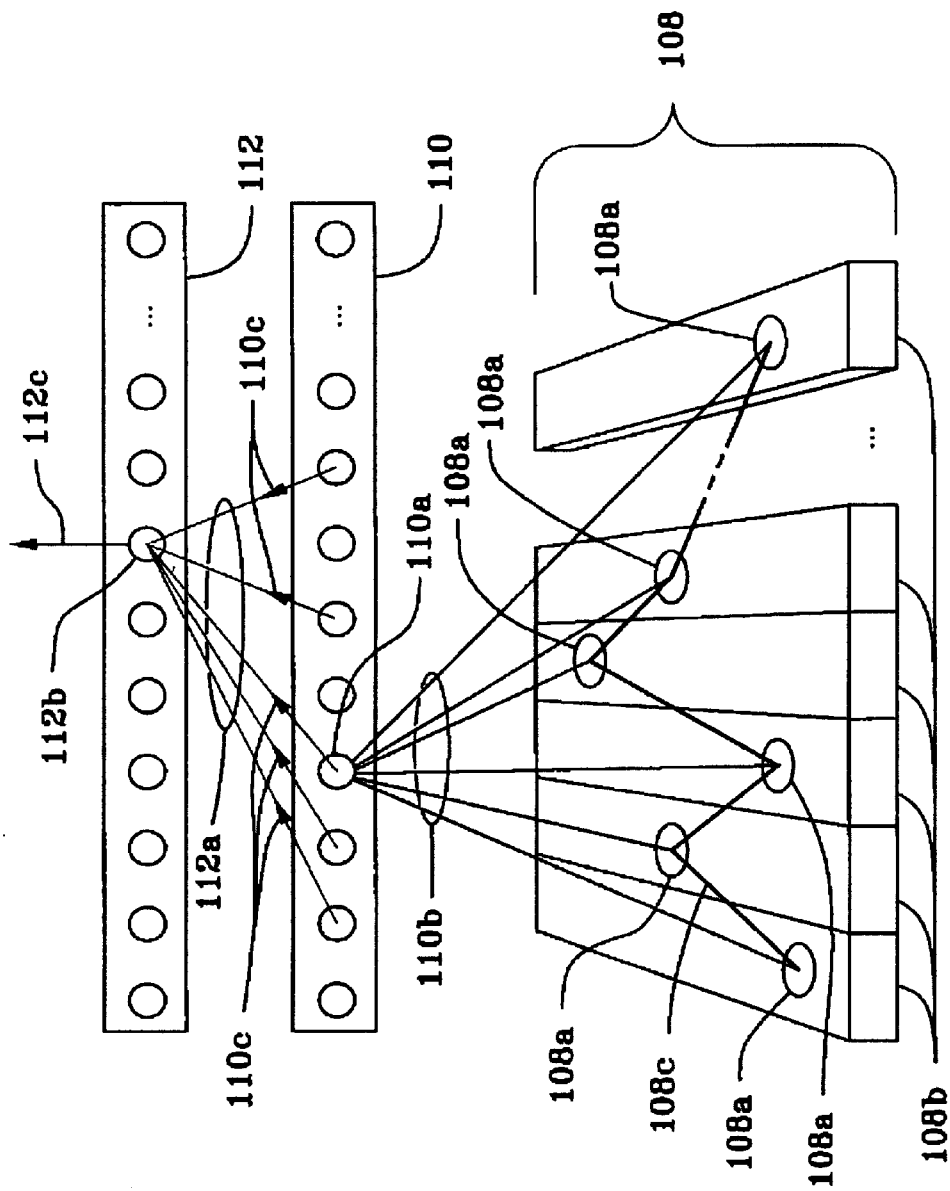
FIG. 9 is a schematic representation of a multidimensional memory space, a recognition vector array and a probability neural network of the dynamic memory processor.

Referring now to FIG. 9, there is shown a schematic representation of populated, multidimensional, memory space 108, as well as recognition vector array 110 and probability neural network 112. Each ellipse 108a signifies an active $PKOM_n$ output at a memory location in a multi-dimensional memory subspace 108b, with each subspace 108b representative of the output dimensionality of the neural director of the harmonic neural network $102_n$ corresponding to $PKOM_n$. Thus each ellipse 108a is associated with the output dimension of each memory subspace 108b, or a set of features of the input pattern, having the highest contribution in the feature vector. Associative matched unitary connections are applied between each populated memory location 108a and an unassigned neuron 110a of recognition vector array 110 forming connection set 110b. Unassigned neuron 110a is one of a plurality of neurons within recognition vector array 110. Neuron 110a with its connection set 110b becomes a recognition vector of vector array 110, corresponding to the active memory pattern as illustrated by line 108c. Thus, the neuron 110a and a set of connections 110b which contains a representation of a known memory vector pattern 108c is in actuality a replica-correlator neural circuit.

Dynamic memory processor 100 operates on time variant input patterns, thus a plurality of recognition vectors are established for each time variant input pattern. In a manner similar to the establishment of connection set 110b from activations 108a, groups of recognition vectors outputs from activated neurons 110a, denoted by arrows 110c, are connected through probability connections 112a to neuron 112b within probability neural network 112 to become a probability vector within network 112. The neurons 112b have the property of limited, leaky integrators. When activated by recognition vector outputs through probability connections 112a, a neuron 112b integrates the sequence of activations to a maximum limit. The connection value assigned to a probability connection 112a is a normalized value of the set representing each probability connection's period of recognition vector activity, i.e., the recognition vector output of activated neurons 110a over the presentation period of a training time variant input pattern. When the same probability vector, or any other probability vector of network 112, is activated by random input noise, the neuron 112b will leak the infrequent random activations that occasionally match a recognition vector of array 110, i.e., the probability neuron 112b attempts to integrate the random activations, but the leakage rate is higher than the integration rate of the random input noise pattern. When probability neuron 112b integrates a sequence of training activations, probability vector output 112c is provided to class PKOM 114. The position determined by class PKOM 114 for probability vector output 112c is assigned a unique value, which serves as the classification identifier for the input pattern. Thus, whenever an input pattern for which the dynamic memory processor has been trained is received, class PKOM 114 provides a unique, predetermined value, or classification identifier, corresponding to the classification of the input pattern. The above process is repeated as required for all initial training or for the retraining of a new classification for the dynamic memory processor 100. It will be appreciated that the architecture of the dynamic memory processor 100 allows trained connections to be loaded from another dynamic memory processor 100 such that a complete dynamic memory processor 100 may be manufactured a priori.

Thus, for a given feature vector output of a neural sensor resulting from a time variant pattern input to the neural sensor, the dynamic memory processor of the present invention provides a classification identifier for the input pattern. The feature vector is input to a plurality of harmonic neural networks which generate an ordered set of output vectors. The nonlinearity of the plurality of harmonic neural networks provides an increased sensitivity to slight differences in similar input patterns. Each output vector of the ordered set is provided to a PKOM circuit which, in turn, populates a memory space corresponding to the dimensionality of the component having the highest value of each output vector. A plurality of recognition vectors associated with the populated memory space is activated within a recognition array which, in turn activate a probability vector within a probability neural network. The probability vector is processed through a class PKOM which outputs the classification identifier corresponding to the activated probability vector. The dynamic memory processor is capable of learning a classification in a single application of an input pattern and can learn a new classification without relearning previously learned data. Further, a dynamic memory processor trained to recognize a certain classification of input patterns can be used as a template for additional dynamic memory processors which will recognize members of the same input pattern classification without training.

Figure 10A:
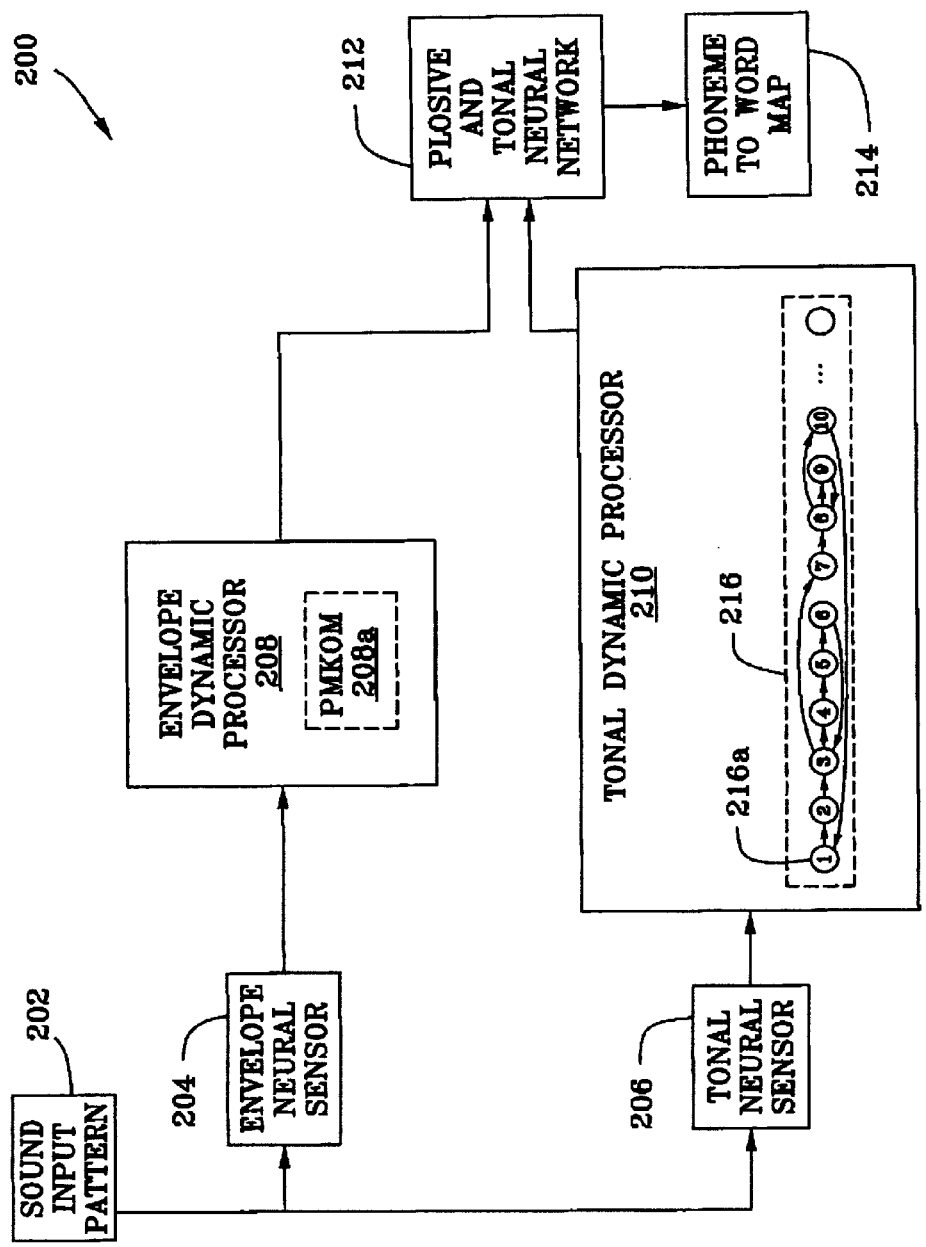
FIG. 10A is a functional block diagram of a speech to word processor utilizing two dynamic memory processors.

Although the dynamic memory processor of the present invention has been described relative to a specific embodiment thereof, it is not so limited. For example, a speech to word processor may be constructed by combining two dynamic memory processors. FIG. 10A provides a functional block diagram for speech to word processor 200. The speech to word processor 200 contains a neural architecture which has a correlation to several biological processes in the human brain. Research on the human brain where the right or left hemisphere of the brain has been damaged, referred to a "broken brain" research, has shown that sound is processed differently in each hemisphere. A properly functioning left hemisphere processes speech in such a manner that the listener understands the words spoken, but the left hemisphere alone lacks the ability to recognize who is speaking, or to recognize the emotional characteristics of the speech. A properly functioning right hemisphere processes the tonal quality of speech, or of music, such that the listener can sense who is speaking and the emotional aspects of the speech or sound, but lacks the ability to recognize the meaning of the words or sounds. An example of this can occur in a normally functioning brain when listening to a totally foreign language. Research has also shown that a normally functioning brain can hear a word correctly when all the tonal information is replaced with random noise, but the same sound envelope is maintained. Thus, a listener can understand a person who is talking without the use of vocal cords, e.g., a person using a monotone throat vibrator and mouthing the modulations of speech. The speech to word processor 200 works in the manner of the human brain in separately processing different features of speech information.

In speech to word processor 200 of FIG. 10A, a sampled sound input pattern 202 is provided to an envelope neural sensor 204 and a tonal neural sensor 206. Sensors 204 and 206 are constructed in the manner of sensor 20 of FIG. 2. Envelope sensor 204 converts an envelope of the sound to be processed into an envelope fused feature vector for input to envelope dynamic processor 208. Tonal sensor 206 converts the sound within the envelope to a sound fused feature vector for input to tonal dynamic processor 210. Envelope and tonal dynamic processors 208 and 210 are constructed in the manner of dynamic memory processor 100 of FIG. 4. However, envelope dynamic processor 208 uses PMKOM circuits 208a in lieu of PKOM circuits 106 (FIG. 4). Where each PKOM circuit 106 output is a unitary value at a specific position in its Euclidean output space that represents the major direction of its input vector with other outputs negated, each PMKOM circuit 208a generates an ordered set of output elements, each element of the ordered set having a value corresponding to a dimension, or component of the input vector, the highest value being a unitary value and associated with the dimension for which the feature vector component has the highest value. The ordered set of output elements is provided by a window function as described for MKOM 116 (FIGS. 6–8). In this respect, PMKOM circuits 208a operate in the manner of MKOM circuits 116 to provide an output vector whose components are selectively and nonlinearly changed so as to draw the selected set of components towards the dimensionality of the major contributing component. The PMKOM circuits 208a provides more dimensional information than the PKOM circuits 106 while still reducing the dimensionality of the feature vector, or envelope signal. This increased dimensional information is needed in the envelope dynamic processor 208 in that the envelope signal will change relatively slowly compared to the tonal signal, thus envelope processing requires more sensitivity to small changes in the envelope feature vector's direction.

Figure 10B:
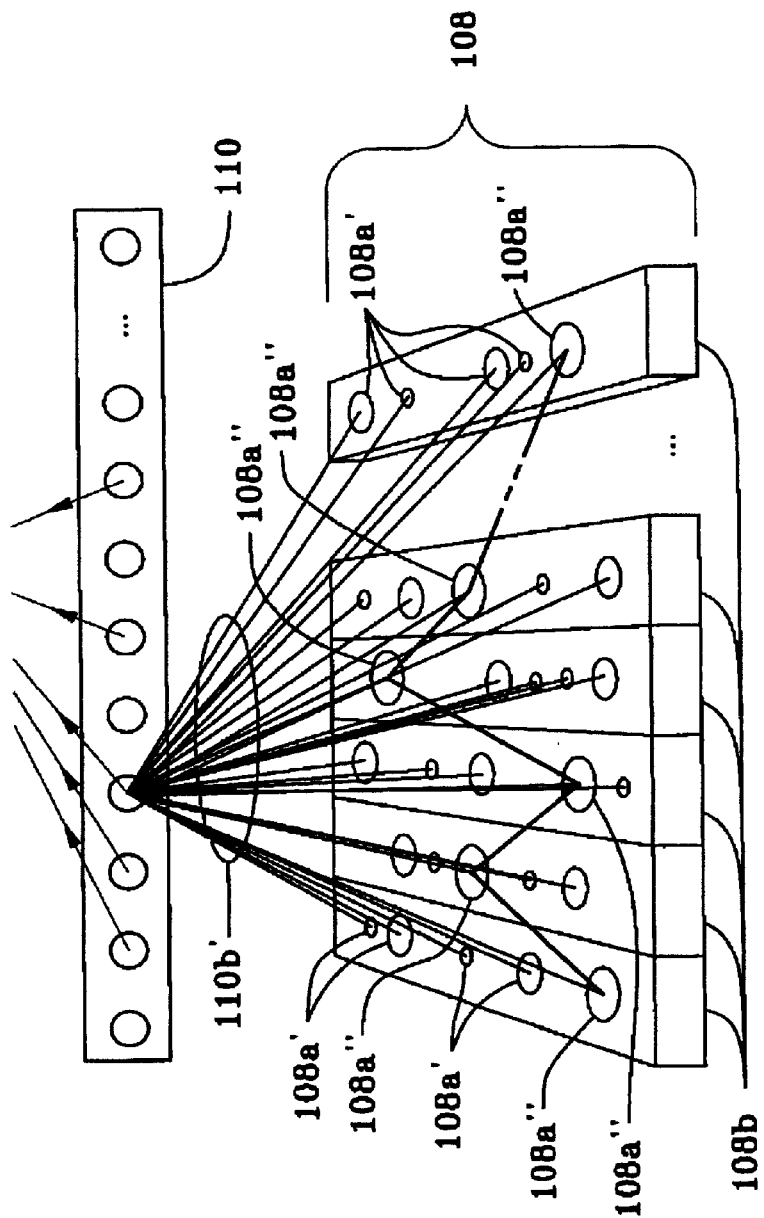
FIG. 10B is a schematic representation of a multidimensional memory space and a recognition vector array of an envelope dynamic memory processor for the speech to word processor of FIG. 10A.

FIG. 10B provides a schematic representation of populated, multidimensional, memory space 108 and recognition vector array 110, corresponding to FIG. 9, for envelope dynamic processor 208 having PMKOM circuits 208a. It can be seen that, within each memory subspace 108b, a plurality of activations 108a' and 108" exist, only some of which have been labeled for clarity. The relative strengths of the activations, as denoted by the size of the ellipses depicting the activation 108a' and 108a" in FIG. 10B, are determined in accordance with the window function of the PMKOM circuit 208a. The largest or strongest activation within each memory subspace 108b, denoted 108a", corresponds to the unitary value associated with the dimension for which the feature vector component has the highest value. The connection set 110b' for envelope dynamic processor 208 thus includes connections from each activation 108a' and 108a", within each memory subspace 108b. The values of the connections of connection set 110b' are determined as a normalized set of connections 110b' in proportion to all activation values 108a' and 108a" as sensed by each connection in the connection set 110b'.

The probability vectors of envelope and tonal dynamic processors 208 and 210 are input to plosive and vocal neural network 212, which power sums the concurrent output activations from processors 208 and 210 and then operates in the manner of class PKOM 114 of FIG. 4. The two paths of sensing and processing (envelope and tonal) allow for greater discrimination of plosive sound (e.g., "t" in toy and "k" in king) and vocalized sound (e.g. the common vowel sounds). Plosive sound is processed through the envelope sensor 204 and envelope dynamic processor 208 path while vocalized sound is processed through the tonal sensor 206 and tonal dynamic processor 210 path. Plosive and vocal neural network 212 outputs classification identifiers which correspond to phonemes of the spoken input pattern. Vocal neural network 212 receives two inputs, one each from envelope and tonal dynamic processors 208 and 210. Thus each neuron of vocal neural network 212 contains a power sum such that the output activation is greater than the simple sum of the two inputs. This allows for stronger matching of widely dispersed phoneme activations than partial low level activations of near matching phonemes. Then, just as PKOM 114 of FIG. 4, vocal neural network 112 chooses the highest activation of its neuron array and presents it to the phoneme to word map as the classification identifiers. The classifications identifiers are input to phoneme to word map 214 which has an output corresponding to the spoken input pattern, as will be further described in relation to FIG. 11. Thus, speech to word processor 200 operates as an automatic speech recognition system and the output can be tailored for a variety of uses, e.g., telephone communications, voice dialing, combat and command control systems and aids for the physically disabled. In one embodiment particularly useful for the hearing impaired, the phoneme activations of neural network 212 drive a multichannel artificial cochlear implant device. Such devices are well known in medical fields dealing with hearing impairment. In another embodiment useful for the hearing impaired, the phoneme activations drive a somatic sensory stimulator device to produce different phoneme activations over different spatial areas on the human body. With the proper training, the hearing impaired can quickly learn the "vocabulary" of the stimulated areas.

As vocalized phonemes typically have highly repeatable waveforms, tonal dynamic processor 210 may incorporate recursive recognition vector 216, which operates in the manner of recognition vector array 110 of FIGS. 4 and 9, except that recursive recognition vector array 216 provides a temporal mapping of its activated recognition vectors 216a. The temporal mapping is provided during the learning process to produce the use of an activation transfer function which is a learned time varied connectivity that is normalized to the mapping tempo. The activation transfer function enhances or de-emphasizes the activations of its interface neurons. In training, the periods of time between each neural activations 112a is noted. The sum of all periods between the activations of each recognition vector produced through the training of a temporal pattern is equal to the period of time of the temporal pattern. The average period of time between repetitive neural activations is noted and all repetitive activations above a selected threshold of repetition occurrences are normalized into a time varying connectivity as a temporal connection between each respective activation 112a where the average time represents a connectivity value and the connectivity value for times above and below the average becomes less as the difference from the average increases. As a result of the temporal neural connection, each major recognition vector activation 112a receives an activation from a previous activation 112a as well as the recognition vector input activations 108c (connection set 110b) from the memory vector space 108. An increased level of activations is transferred to the probability neuron 112b when both the spatial activations 108c (connection set 110b) and the sequences of the temporal activation of neurons 216a of a phoneme input pattern are matched.

Temporal mapping provides a greater sensitivity recognition of phoneme input patterns. For example, a hypothetical vocalized recursive phoneme may have a sequence of activations $216a_1$, $216a_2$, $216a_3$, $216a_4$, $216a_5$, $216a_6$, $216a_3$, $216a_7$, $216a_8$, $216a_9$, $216a_8$, $216a_{10}$ and returning to $216a_1$. Without temporal mapping, recognition vector array 110 of FIGS. 4 and 9 would have equal activations $110a_{1-10}$. The activation transfer function, however, enhances activations $216a_3$ and $216a_8$ and de-emphasizes $216a_6$, $216a_9$ and $216a_{10}$, in a manner consistent with the temporal sequence of activations. Thus, in the standard recognition vector array 110 of FIGS. 4 and 9, two phoneme input patterns having the same activations, but having different temporal mapping could result in the same probability connections. The recursive recognition vector array 216 provides the means for distinguishing between such input patterns, producing a higher, faster response to the sound input pattern than the standard recognition vector array 110 of FIGS. 4 and 9.

Figure 11:
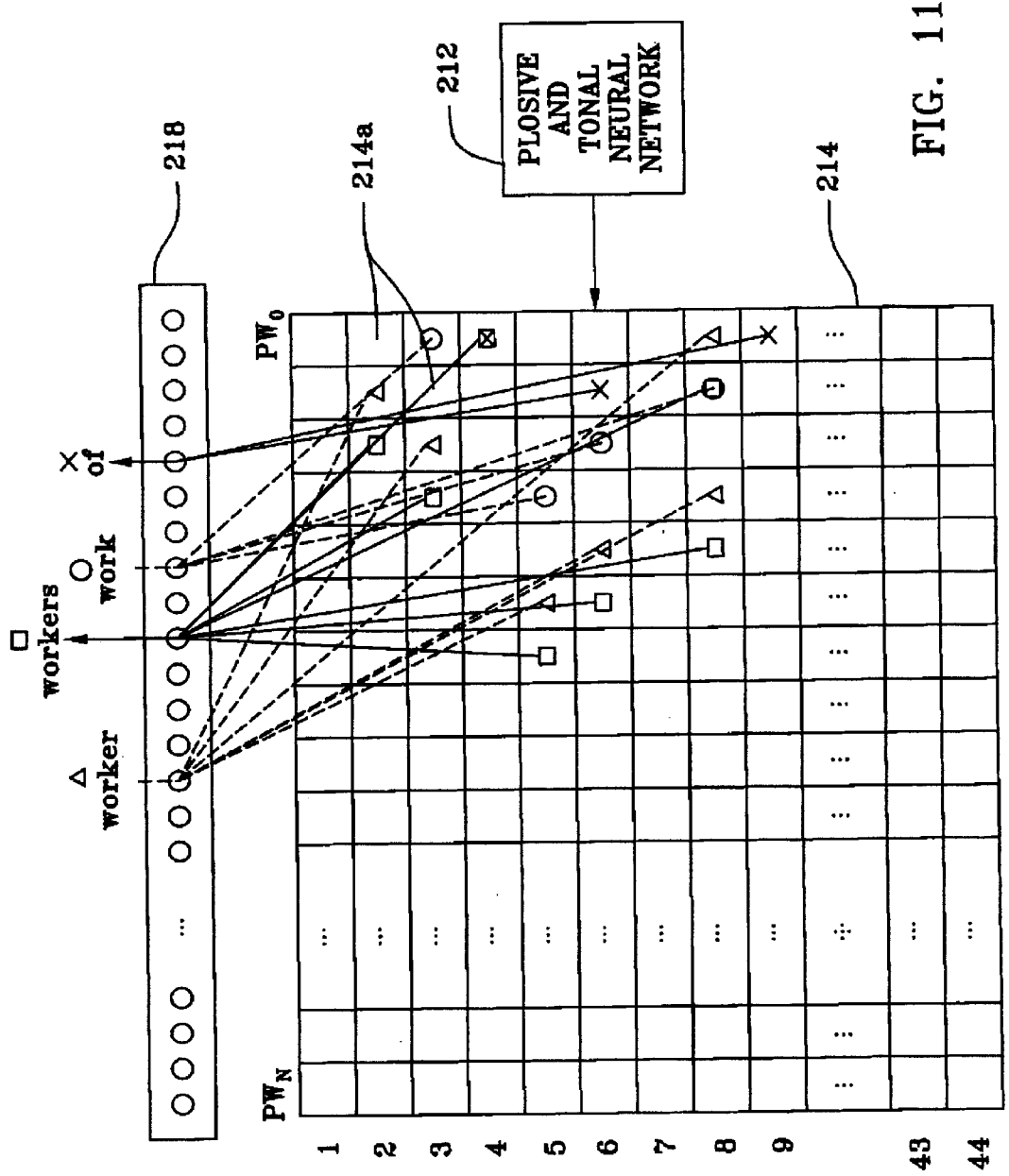
FIG. 11 is a schematic representation of a phoneme to word map for the speech to word processor of FIG. 10A.

Referring now to FIG. 11, there is shown a schematic representation of phoneme to word map 214. As a phoneme classification identifier (referred to simply as a phoneme hereafter) is received from plosive and neural network 212, it is placed in a corresponding cell 214a of register $PW_0$ of phoneme to word map 214. In the representation of FIG. 11, each register $PW_n$, or column, of phoneme to word map 214 contains the full complement of phonemes for the language of the input pattern (44 phonemes for the representation shown in FIG. 11). As each succeeding phoneme is received, the previous phonemes are shifted to the next register. Each phoneme causes activations in sparse spatial normalized matched filters 218 over word map 214. A set of normalized connection values that make a normalized match filter, provides each word with equal output values to allow a balanced competition between words regardless of the phoneme length of the word. When a set of activations matches that for a word in the system vocabulary, the word is recognized by sparse spatial matched filters 218, but is held until released. Release of a word may be triggered by a pause in speech input which will clear the corresponding cells 214a and release any held words. Release may also be triggered by the input of a non-related phoneme. For example, in receiving the phonemes for the words "workers of" followed by a pause, the word "work" is first recognized and held. Similarly, the word "worker" is held and also "workers". When the phonemes for the word "of" are received, the word "workers" is released as matched filters 218 would not recognize the compound word "workersof". Similarly, the words "work" and "worker" are cleared as there is no match filter recognition of the sounds "ers", "ersof", "s", or "sof", which would remain should either of these words be released. The pause following "of" releases the word "of". In the representation of FIG. 11, the word "work" is illustrated by phonemes in rows 5, 6, 8 and 3 (symbol ○); the word "worker" by additional phonemes in rows 2 and 8 (symbol Δ); and the word "workers" by an additional phoneme in row 4 (symbol □). For purposes of illustration, the "phonemes" of FIG. 11 correspond to the letters making up the words. Each word is recognized by one of the match filters 218. Similarly, the word "of" is illustrated by phonemes in rows 6 and 9 (symbol ×) and recognized by another of the match filters 218. In systems requiring large vocabularies, phoneme to word map 214 may be combined with syntax systems to properly define some word combinations.

It will be appreciated that a number of additional modifications may be made to dynamic memory processor 100 depicted in FIG. 4. For example, the classifier network 104 may include MKOM circuits in place of PKOM circuits 106. In addition, harmonic neural network 102 may include a single neural director, preferably second harmonic neural director 124, instead of first and second harmonic neural directors 120 and 124. Also, either or both harmonic decoupler 122 and harmonic normalizer 126 need not be present in harmonic neural network 102 depending on the input pattern to be received.

Figure 12:
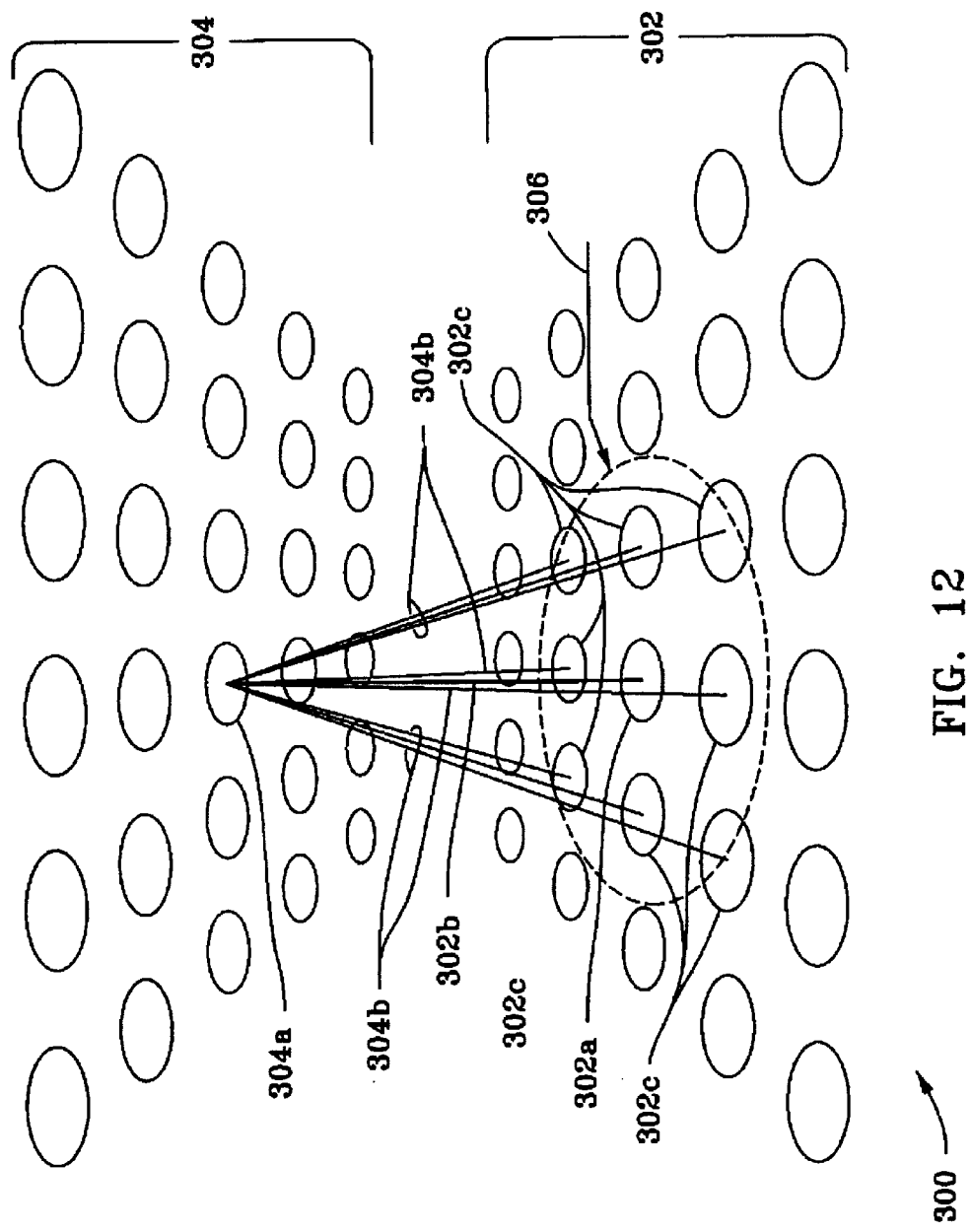
FIG. 12 is a schematic representation of a common vector neural network for one embodiment of the dynamic memory processor.

Referring now to FIG. 12, a further modification to dynamic memory processor 100 of FIG. 4 may be provided by the addition of common vector neural network 300 between each PKOM 106 and each multi-dimensional memory space 108b of FIGS. 4 and 9. Common vector neural network 300 improves a processor's pattern detection in a noisy field. Common vector neural network 300 has a common vector input layer 302 and a common vector output layer 304. The input and output layers 302 and 304 are concentric multi-dimensional spherical spaces having the same dimensions and neural spacing as the input neural director 122 to the common vector neural network 300. Each input neuron 302a of input layer 302 has a unitary connection, indicated as line 302b, to its corresponding output neuron 304a of output layer 304. In addition, each output neuron 304a is connected to a set of nearest neighbor neurons 302c of its corresponding input neuron 302a. A common vector external control 306 (a cosine value) adjusts the breadth of the nearest neighbor set from a preselected maximum down to a one to one mapping, i.e., only the unitary connection 302b between the input neuron 302a and the output neuron 304a remains and no nearest neighbor neurons 302c are actively connected to output neuron 304a. The mapping of the nearest neighbor connections, indicated by lines 304b, is a function of the weighting set vector of the input neural director 122 through one PKOM 106 to the common vector neural network 300. The assignment of the common vector neural network 300's connections 304b are relative to each input neuron 302a's position in space. Each set of the connections 304b relative to each neuron 302c are ranked in order of their closeness of the cosine values to their position in space. The ranking of each input neuron 302a to all the remaining neurons of input layer 302 becomes the relative mapping of output neuron 304a to nearest neighbor neurons 302c. The weight values for connections 304b can be assigned in any one of many ways providing the assignment produces high connectivity to similar featured neurons and low connectivity to less similar featured neurons. For example, the assigned weight values may be the cosine values between the input network's output neurons corresponding to input neuron 302a and nearest neighbor neurons 302c, or weight values representing a common window function assigned relative to said ranking of input neurons 302a.

In the absence of noise, a fixed set of features at the input to a neural director and a PKOM output produces one specific, or unique, highest activation output, corresponding to input neuron 302a. When noise, with a constant probability of occurrence for each sample, is added to the feature set, the single activation will drop substantially as the noise and the feature set now activate nearby, or nearest neighbor outputs, corresponding to nearest neighbor neurons 302c, as well as the unique output. By the connections 304b, common vector neural network 300 reconnects the distributed activation field, i.e., the activations over the nearest neighbor neurons 302c, back into the specific unique activation 304a. In this manner, the next neural layer following common vector neural network 300 only sees the common activations output, and the effect of the noise component is substantially reduced.

The invention as described herein provides a number of advantages. Particularly, the dynamic memory processor provides a memory processing architecture for a variety of types of sensors which can generate an output feature pattern from input data without training or learning as would be required for a conventional neural network. Thus, it will be understood that many additional changes in the details, steps and arrangement of parts, which have been herein described and illustrated in order to explain the nature of the invention, may be made by those skilled in the art within the principle and scope of the invention as expressed in the appended claims.

What is claimed is:

1. A dynamic memory processor in combination with a neural sensor, the neural sensor receiving a time varying input data pattern and outputting a series of feature vectors to the dynamic memory processor, the feature vectors containing information on sets of features of the input data, the dynamic memory processor comprising:

a plurality of harmonic neural networks connected in series, each harmonic neural network receiving an input vector and outputting a focused feature vector containing information on one of the sets of features of the input data and further outputting a processed feature vector as the input vector to a succeeding harmonic neural network, a first in the series of harmonic neural networks serially receiving each feature vector of the series of feature vectors as its input vector wherein each harmonic neural network comprises i) a MKOM circuit receiving the input vector and providing an ordered set of output elements, ii) at least one harmonic neural director receiving the ordered set of output elements and outputting the focused feature vector, and iii) a harmonic normalizer receiving the focused feature vector and outputting the processed feature vector; and a classifier network serially receiving each feature vector and the focused feature vectors associated with each feature vector, activating a series of recognition vectors in response to the serially received feature vectors and focused feature vectors, activating probability vectors in response to the series of recognition vectors and generating classification identifiers in response to the probability vectors allowing for recognition of the input data pattern.

2. The dynamic memory processor of claim 1 wherein at least one of the harmonic neural networks further comprises a harmonic decoupler removing a fixed offset present in the ordered set of output elements.

3. The dynamic memory processor of claim 1 further comprising an external control to the MKOM circuit operating on the ordered set of output elements in accordance with a degree of nonlinearity.

4. The dynamic memory processor of claim 1 wherein the MKOM circuit further comprises a plurality of KOM circuits connected in series, each KOM circuit outputting one element of the ordered set of output elements corresponding to the order of each KOM circuit within the series of KOM circuits.

5. The dynamic memory processor of claim 4 wherein each KOM circuit further comprises:

a set of input processing nodes corresponding in number to elements of the input vector, each input processing node expressing a value of its corresponding input vector element;

a corresponding set of output processing nodes;

a set of KOM connections separately connecting each input processing node to its corresponding output processing node; and a plurality of difference nodes associated with each output processing node, each difference node having polarized inputs, each input processing node connected in parallel to one of the polarized inputs of the plurality of difference nodes associated with the corresponding output processing node and each input processing node further connected to an oppositely polarized input of one of the difference nodes associated with each non-corresponding output processing nodes, each plurality of difference processing nodes providing a difference output to its respective output processing node, the difference output inhibiting the KOM connection between the associated output processing node and the corresponding input processing node when the value expressed by the input processing node is not the largest value of the plurality of input processing nodes and activating the KOM connection when the value expressed by the input processing node is the largest value, the activated KOM connection allowing the output processing node to output the one element of the ordered set of output elements.

6. The dynamic memory processor of claim 5 wherein each KOM circuit further comprises an inhibit connection between each output processing node and corresponding input processing nodes in succeeding KOM circuits, the inhibit connection being activated when the KOM connection is activated, the activated inhibit connection inhibiting the corresponding input processing nodes in succeeding KOM circuits from expressing the value of the input vector element.

7. The dynamic memory processor of claim 5 further comprising an external control to the KOM connections operating on the KOM connections in accordance with a predetermined function, the ordered set of output elements conforming to the predetermined function.

8. The dynamic memory processor of claim 1 wherein the MKOM circuit further comprises:
   a set of input processing neurons corresponding in number to elements of the input vector, each input processing neuron expressing a value of its corresponding input vector element;
   a corresponding set of output processing neurons, each input processing neuron being connected directly to its corresponding output processing neuron; and
   a corresponding set of inhibit neurons, each inhibit neuron connected through a negative unit connection to its corresponding output processing neuron, each inhibit processing neuron further connected to its nearest neighbor set of input processing neurons, each inhibit neuron passing a value corresponding to the highest value expressed by the nearest neighbor set to the corresponding output processing neuron, the output processing neuron outputting a sum of the value expressed by the corresponding input processing neuron and the value passed by the corresponding inhibit neuron to provide the ordered set of output elements.

9. The dynamic memory processor of claim 8 further comprising an external control to the MKOM circuit operating equally on the value passed by each of the inhibit neurons.

10. The dynamic memory processor of claim 1 wherein the classifier network further comprises:
    a first PKOM circuit serially receiving each feature vector and outputting a series of first unitary values at a position representing a highest contributing direction of each feature vector;
    a plurality of additional PKOM circuits, each additional PKOM circuit serially receiving one of the focused feature vectors associated with the feature vector and outputting a series of additional unitary values at additional positions representing a highest contributing direction of its focused feature vector;
    a multidimensional memory space serially partially populated by the series of unitary values outputted by the first and additional PKOM circuits;
    a recognition vector array, the serially partially populated multidimensional memory space serially activating a series of sets of recognition vectors within the recognition array;
    a probability neural network generating the probability vectors in response to the series of sets of recognition vectors, the probability vectors representing a probability that the time varying input data represents a particular set of features; and
    a class PKOM circuit outputting the classification identifiers for the particular set of features at a position representing a highest contributing direction of the probability vectors.

11. The dynamic memory processor of claim 1 wherein the classifier section further comprises at least one common vector neural network ameliorating noise effects in the activation of the recognition vectors.

12. The dynamic memory processor of claim 11 wherein the at least one common vector neural network comprises:
    a layer of input neurons;
    a layer of output neurons, each output neuron corresponding to one input neuron in the layer of input neurons;
    a unitary connection between each output neuron and the corresponding one input neuron; and
    a weighted set of connections between each output neuron and a set of nearest neighbor input neurons, the nearest neighbor set being a function of cosine values of input elements activating the recognition vectors.

13. The dynamic memory processor of claim 12 wherein the at least one common vector neural network further comprises an external control for activating a selected subset of the nearest neighbor set, the selection providing maximum amelioration of the noise effects.

14. The dynamic memory processor of claim 10 wherein the classifier section further comprises at least one common vector neural network ameliorating noise effects in the activation of the recognition vectors.

15. A speech recognition memory processor in combination with a neural envelope sensor and a neural tonal sensor, the neural sensors receiving an input pattern of spoken words and outputting a series of envelope feature vectors and a series of tonal feature vectors, respectively, to the speech recognition memory processor, the feature vectors containing information on sets of features of the input pattern, the speech recognition memory processor comprising:
    a plurality of envelope harmonic neural networks connected in series, each envelope harmonic neural network receiving an envelope input vector and outputting a focused envelope feature vector containing information on one of the sets of envelope features of the input pattern and further outputting a processed envelope feature vector as the envelope input vector to a succeeding envelope harmonic neural network, a first in the series of envelope harmonic neural networks serially receiving each envelope feature vector of the series of envelope feature vectors as its envelope input vector;
    a plurality of tonal harmonic neural networks connected in series, each tonal harmonic neural network receiving a tonal input vector and outputting a focused tonal feature vector containing information on one of the sets of tonal features of the input pattern and further outputting a processed tonal feature vector as the tonal input vector to a succeeding tonal harmonic neural network, a first in the series of tonal harmonic neural networks serially receiving each tonal feature vector of the series of sound feature vectors as its tonal input vector;

an envelope classifier network serially receiving each envelope feature vector and the focused envelope feature vectors associated with each envelope feature vector, activating a series of envelope recognition vectors in response to the serially received envelope feature vectors and focused envelope feature vectors and activating envelope probability vectors in response to the series of envelope recognition vectors;

an tonal classifier network serially receiving each tonal feature vector and the focused tonal feature vectors associated with each tonal feature vector, activating a series of tonal recognition vectors in response to the serially received tonal feature vectors and focused tonal feature vectors and activating tonal probability vectors in response to the series of tonal recognition vectors;

a plosive and tonal neural network receiving the envelope and tonal probability vectors and generating classification identifiers representing a highest contributing direction of the probability vectors, the classification identifiers corresponding to phonemes constituting the spoken words of the input pattern; and a phoneme to word map receiving the classification identifiers and combining the classification identifiers into a phoneme pattern corresponding to the spoken words of the input pattern.

16. The speech recognition memory processor of claim 15 wherein the phoneme to word map comprises:

an array of cells, a dimension of the array having a number of cells corresponding to a maximum number of phonemes in a language of the spoken words, each cell in the dimension corresponding to one phoneme, the classification identifiers from the plosive and tonal neural network serially populating corresponding cells in the array, each populated cell being shifted in a second array dimension as additional classification identifiers are received from the plosive and tonal neural network; and a series of sparse spatial matched filters over the array, each filter corresponding to a word in the language, each filter outputting its corresponding word when the populated cells match the filter, the filter clearing the populated cells upon a word output.

17. The speech recognition memory processor of claim 15 wherein the tonal recognition vectors are temporally mapped by respective activation transfer functions, the activation transfer functions enhancing recursive connections of their respective tonal feature and focused feature vectors and de-emphasizing non-recursive connections of their respective tonal feature and focused feature vectors.

18. The speech recognition memory processor of claim 15 wherein the envelope classifier network further comprises:

a first PMKOM circuit serially receiving each feature vector and outputting a series of ordered sets of output elements, each element of each of the ordered sets having a value corresponding to a dimension of the feature vector, the highest values of each of the ordered sets being a unitary value at a position representing a highest contributing direction of each feature vector;

a plurality of additional PMKOM circuits, each additional PMKOM circuit serially receiving one of the focused feature vectors associated with the feature vector and outputting a series of additional ordered sets of output elements, the unitary values of which being at additional positions representing a highest contributing direction of its focused feature vector;

a multidimensional memory space serially partially populated by the series of ordered sets of output elements outputted by the first and additional PMKOM circuits;

a recognition vector array, the serially partially populated multidimensional memory space serially activating a series of sets of recognition vectors within the recognition array;

a probability neural network generating the probability vectors in response to the series of sets of recognition vectors, the probability vectors representing a probability that the time varying input data represents a particular set of features; and a class PKOM circuit outputting the classification identifiers for the particular set of features at a position representing a highest contributing direction of the probability vectors.

19. The dynamic memory processor of claim 8 further comprising an external control to the PMKOM circuits operating equally on each PMKOM circuit to define the relative values of the components of each of the ordered sets of output elements.

20. The speech recognition memory processor of claim 15 wherein the phoneme to word map comprises a multichannel artificial cochlear implant.

21. The speech recognition memory processor of claim 15 wherein the phoneme to word map comprises a somatic sensory stimulator device to produce sensory stimulation over different spatial areas on a human body corresponding to the phoneme pattern.

* * * * *